US009778631B2

(12) United States Patent
Krenik

(10) Patent No.: US 9,778,631 B2
(45) Date of Patent: Oct. 3, 2017

(54) POSITIONING DEVICE FOR AUTOMATED HAIR CUTTING SYSTEM

(71) Applicant: Matthew W. Krenik, Garland, TX (US)

(72) Inventor: Matthew W. Krenik, Garland, TX (US)

(*) Notice: Subject to any disclaimer, the term of this patent is extended or adjusted under 35 U.S.C. 154(b) by 506 days.

(21) Appl. No.: 14/156,817

(22) Filed: Jan. 16, 2014

(65) Prior Publication Data

US 2014/0200734 A1 Jul. 17, 2014

Related U.S. Application Data

(60) Provisional application No. 61/753,072, filed on Jan. 16, 2013, provisional application No. 61/843,094, filed on Jul. 5, 2013, provisional application No. 61/820,015, filed on May 6, 2013.

(51) Int. Cl.
| | | |
|---|---|---|
| B26B 19/38 | (2006.01) | |
| B26B 21/40 | (2006.01) | |
| G05B 15/02 | (2006.01) | |
| A45D 24/36 | (2006.01) | |
| A45D 7/00 | (2006.01) | |

(52) U.S. Cl.
CPC ............. *G05B 15/02* (2013.01); *A45D 24/36* (2013.01); *A45D 2007/007* (2013.01)

(58) Field of Classification Search
CPC .............. B26B 19/388; B26B 19/3806; B26B 19/3846; B26B 19/42; B26B 21/4081; Y10T 83/04

See application file for complete search history.

(56) References Cited

U.S. PATENT DOCUMENTS

| | | | | |
|---|---|---|---|---|
| 3,054,183 A | | 9/1962 | Zucker | |
| 3,413,985 A | * | 12/1968 | Dlouhy | A45D 44/06 132/213 |
| 3,536,079 A | | 10/1970 | Dlouhy et al. | |
| 3,678,944 A | * | 7/1972 | Berry | B26B 19/00 132/213.1 |

(Continued)

FOREIGN PATENT DOCUMENTS

| | | |
|---|---|---|
| FR | 2964023 A1 | 3/2012 |
| GB | 2462812 A | 2/2010 |

OTHER PUBLICATIONS

Herrera et al., Toward image-based facial hair modeling, May 2010, 8 pages.*

(Continued)

*Primary Examiner* — Thuy Dao
(74) *Attorney, Agent, or Firm* — Richard G. Eldredge; Eldredge Law Firm

(57) ABSTRACT

A positioning device includes a frame having at least a front frame and one or more side frames; and a plurality of positioning interfaces, the positioning interfaces configured to at least one of transmit signals and receive signals, the signals being configured to at least partially determine at least one of position and orientation of a hair cutting device, the plurality of positioning interfaces positioned at various intervals about the frame. The front frame includes at least one structural feature designed to contact at least one feature of a user's face, and the front frame extends at least partially across said user's face.

17 Claims, 18 Drawing Sheets

(56) References Cited

U.S. PATENT DOCUMENTS

| | | | |
|---|---|---|---|
| 3,972,075 A * | 8/1976 | Alevras | A45D 4/02 |
| | | | 132/214 |
| 4,602,542 A * | 7/1986 | Natrasevschi | B26B 19/00 |
| | | | 132/214 |
| 6,973,931 B1 | 12/2005 | King | |
| 9,656,400 B2 * | 5/2017 | Krenik | B26B 19/42 |
| 2004/0004559 A1 | 1/2004 | Rast | |
| 2005/0091727 A1 * | 5/2005 | Fowler | A45D 44/12 |
| | | | 2/174 |
| 2009/0303320 A1 | 12/2009 | Davis | |
| 2011/0018985 A1 | 1/2011 | Zhu | |
| 2012/0234146 A1 * | 9/2012 | Lakin | B26B 19/00 |
| | | | 83/76.2 |
| 2013/0042487 A1 * | 2/2013 | Julemont | B26B 19/20 |
| | | | 30/277.4 |
| 2014/0137883 A1 * | 5/2014 | Rothschild | B26B 19/388 |
| | | | 132/200 |

OTHER PUBLICATIONS

International Search Report and Written Opinion dated May 13, 2013, Application No. PCT/US2012/070856, Applicant: Matthew W. Krenik, 8 pages.

* cited by examiner

POSITIONING DEVICE FOR AUTOMATED HAIR CUTTING SYSTEM

CROSS REFERENCE TO RELATED APPLICATIONS

This application claims the benefit of U.S. Provisional Application Ser. No. 61/753,072, filed by Matthew W. Krenik on Jan. 16, 2013 and entitled "Positioning Device for Automated Hair Cutting System"; and U.S. Provisional Application Ser. No. 61/843,094, filed by Matthew W. Krenik on Jul. 5, 2013 and entitled "Positioning System and Techniques for Automated Hair Cutting System"; and U.S. Provisional Application Ser. No. 61/820,015, filed by Matthew W. Krenik on May 6, 2013 and entitled "Enhanced Positioning Device and Method for Automated Hair Cutting System."

FIELD OF THE DISCLOSURE

Embodiments of this disclosure relate to improved positioning devices and positioning methods for automated hair cutting systems. These improvements may provide benefit for how a positioning device fits on a user's head, fit's a variety of users with different head sizes and shapes, provides function in allowing the position and/or orientation of a hair cutting device to be determined relative to the head of a user, includes integrated electronics and wiring, allows coordinates to be assigned to positioning interfaces while accommodating head sizes and shapes of different users, and folds to a compact form for storage.

BACKGROUND

International application number PCT/US12/70856, filed by Matthew W. Krenik on Dec. 20, 2012, entitled "Automated Hair Cutting System and Method of Operation Thereof," (hereinafter "Krenik '856") provides a description of automated hair cutting systems. These systems operate by determining the position and/or orientation of a hair cutting device relative to a user receiving a haircut. Hair may be collected in a cutter head and extended for cutting to a length. Through electronic measurements and computational analysis, the location of where hair on the scalp of a user is collected into a cutter head may be determined and as hair is extended and slides through a cutter head, its length may be substantially determined so that a cutter head may be actuated at a time to cut hair to a length.

In Krenik '856, Krenik teaches multiple positioning devices that include positioning interfaces that may transmit and/or receive positioning signals in the course of interaction with a hair cutting device and possibly other elements of an automated hair cutting system to facilitate the ability of an automated hair cutting system to determine the position and/or orientation of a hair cutting device relative to the head of a user receiving a haircut. Krenik '856 also teaches how positioning devices may be flexible to fit a variety of users, may be folded for storage, and may be calibrated to the face and head of a user through the use of reference points. Review of Krenik '856 makes clear the benefits of positioning devices and methods for applying them that are convenient and easy to use for a variety of users. Positioning devices that fit easily on a user's head, accommodate differences in a user's head size and/or shape, include integrated electronics and wiring, are easily adjusted on a user's head and may easily be calibrated with simple methods once fitted to a user, may have a coordinate system easily associated with them, and fold for compact storage are highly desirable.

SUMMARY

Disclosed herein are various embodiments of automated hair cutting systems and positioning devices and various methods for use therewith.

In one embodiment, a positioning device for use in an automated hair cutting system comprises a frame, the frame comprising at least a front frame and one or more side frames. The positioning device further comprises a plurality of positioning interfaces, the positioning interfaces configured to at least one of transmit signals and receive signals, said signals for at least partially determining at least one of position and orientation of a hair cutting device, the plurality of positioning interfaces positioned at various intervals about the frame. The front frame comprises at least one structural feature designed to contact at least one feature of a user's face, and wherein said front frame extends at least partially across said user's face. In some embodiments, the one or more side frames comprises a first side frame and a second side frame each adjoining said front frame, wherein each side frame comprises an ear support for engaging a user's head near an ear.

In another aspect, a method for assigning coordinate locations to positioning interfaces on a positioning device is disclosed, said positioning device comprising a plurality of positioning interfaces and a structure at least partially extending in front of and to either side of the face of a user wearing said positioning device, so that changes to the locations of said positioning interfaces associated with said positioning device being worn by said user are at least partially accounted for. The method comprises directing said user to adjust said positioning device so that said positioning device is aligned with at least one of said user's eyes and nose; measuring at least one dimension between at least two points on said structure of said positioning device, said two points selected such that the dimension between them may vary depending on the size or shape of the head of a user wearing said positioning device; associating a coordinate system to said positioning device; and determining coordinate values for at least one of said positioning interfaces at least partially based on said at least one dimension between at least two points on said structure of said positioning device.

In another aspect, an automated hair cutting system for cutting hair is disclosed. The system comprises a hair cutting device, the hair cutting device comprising a cutter head having a base surface and at least one sensor, said sensor configured for determining orientation of said hair cutting device; a processor configured to process a mathematical model for providing a head shape of a user; and an electronic circuit for receiving input from said sensor and determining, based on at least one of said input from said sensor and said mathematical model, a location at which said base surface of said cutter head rests on said head of said user.

DETAILED DESCRIPTION

Figure 1:
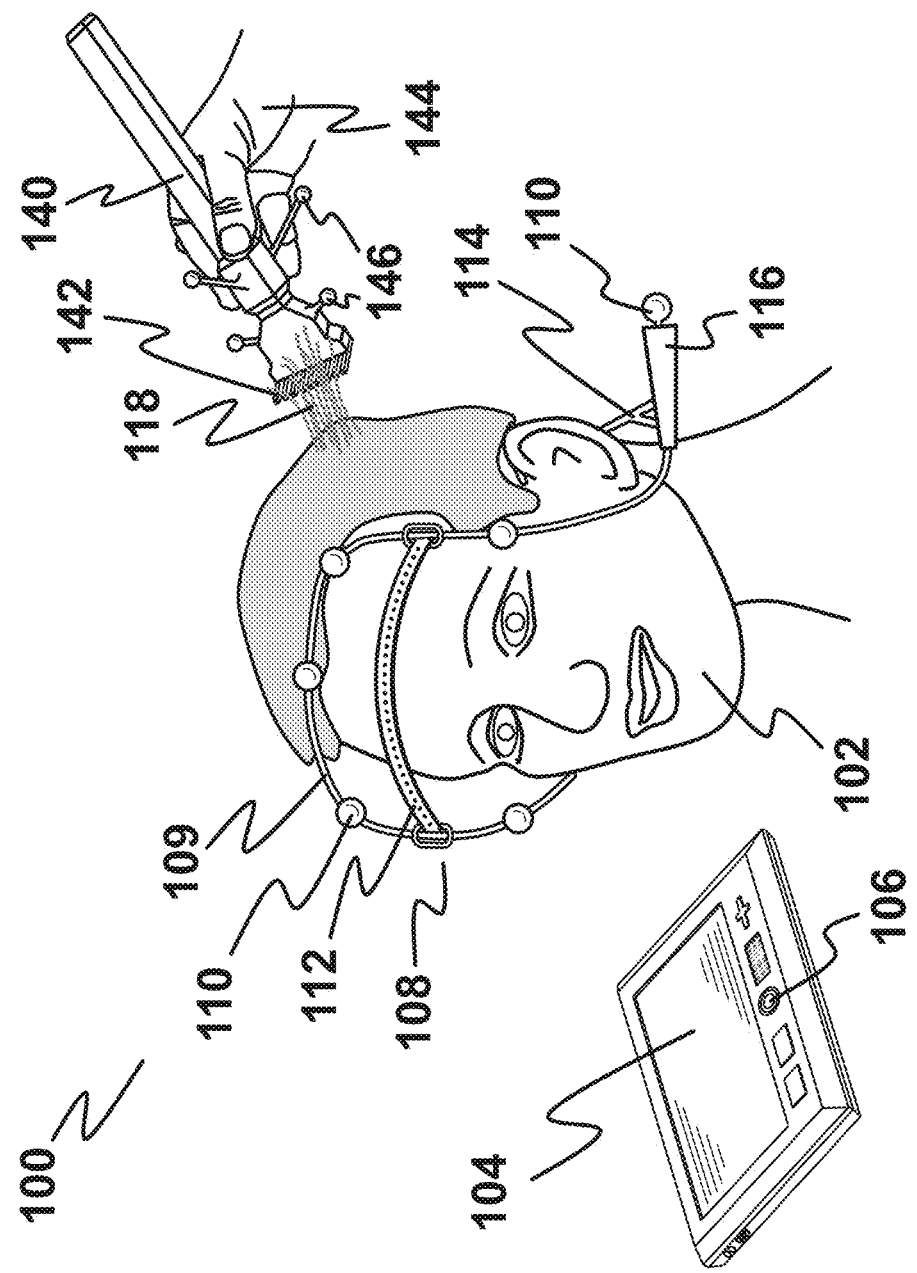
FIG. 1 shows an environmental view of an embodiment of an automated hair cutting system which may be used in conjunction with embodiments according to the present.

FIG. 1 shows an environmental view of an embodiment of an automated hair cutting system 100. The automated hair cutting system 100 comprises an electronic computing device 104, a positioning device 108, and a hair cutting device 140. Electronic computing device 104 may include camera 106 and may provide instructions, information, and may display images or video from camera 106 or other cameras in automated hair cutting system 100. Positioning device 108 is worn by user 102 and comprises a plurality of positioning interfaces 110, main tube 109, housings 116, head band 112, and ear supports 114. Headband 112 and ear supports 114 may secure positioning device 108 to the head of user 102. Housings 116 may contain electronics, batteries, or other elements. Main tube 109 provides the main supporting structure of positioning device 108, and may be somewhat flexible to accommodate the size and shape of the head of user 102. Main tube 109 may also contain electronics or wiring. Hair cutting device 140 is supported by human hand 144 and includes cutter head 142 and positioning sensors 146. Human hand 144 may be the hand of a person operating hair cutting device 140, but operation of hair cutting device by user 102 giving himself a haircut is also possible. Electronic computing device 104, hair cutting device 140, and positioning device 108 may interact with each other through wired or wireless electronic interfaces (these interfaces are not shown in FIG. 1, but are explained in Krenik '856).

One possible mode of operation of automated hair cutting system 100 comprises collecting a region of hair 118 and extending the collected hair through cutter head 142 as hair cutting device 140 is lifted away from the scalp of user 102. Automated hair cutting system 100 monitors at least one of the position and the orientation of hair cutting device 140 relative to the head of user 102 and positioning device 108 so that the location that region of hair 118 was collected on the scalp of user 102 is substantially known and a desired length for region of hair 118 may be determined with reference to a desired hair style for user 102. Once hair has been extended to a desired length, cutter head 142 may be actuated to cut the collected hair. Krenik '856 provides descriptions of automated hair cutting systems, hair cutting devices, cutter heads, positioning devices, positioning interfaces, electronic computing devices, and other elements of automated hair cutting systems. Krenik '856 also explains additional aspects of the operation of automated hair cutting systems.

Automated hair cutting system 100 may use positioning signals between positioning interfaces 110 and positioning sensors 146 on hair cutting device 140. These signals may be electromagnetic signals, sound signals, light signals, infrared light signals, acoustic signals, ultrasonic signals, magnetic signals, radar signals, sonar signals, lidar signals, or other types of signals and may propagate from any of the positioning interfaces on positioning device 108 to any of the sensors 146 on hair cutting device 140. In various embodiments, signals may propagate from a positioning device 108 to a hair cutting device 140, signals may propagate from a hair cutting device 140 to a positioning device 108, and signals may propagate both to and from both positioning devices 108 and hair cutting devices 140. Analysis of these signals may be used in computation of the position and/or orientation of hair cutting device 140 relative to user 102. Some embodiments of automated hair cutting system 100 may analyze the time-of-flight of positioning signals from positioning interfaces 110 to positioning sensors 146 to determine signal propagation distances and compute the position and/or orientation of hair cutting device 140 from the propagation distances from positioning interfaces 110 to positioning sensors 146. Some embodiments may include capability to sense if positioning signals are corrupted, suffered from interference, or suffer other problems and may interrupt operation, notify user 102, or take other appropriate action if positioning signal corruption is detected. For example, an embodiment utilizing ultrasonic signals may suffer signal corruption due to turbulent wind or airflow, loud noises or music, interference from other systems utilizing ultrasound signals, or other causes, that may cause positioning signals to be intermittent, to be at unexpected signal or power levels, to become unrecognizable, or to have other impact that would allow some embodiments to detect issues and take appropriate actions. Corrupted positioning signals may be detected by sensing received signal amplitude or power, analyzing consistency of signal amplitude or power, measuring known distances such as the known distance between positioning interfaces on a positioning device 108 to determine if they measure correctly, measuring signal propagation times in both directions between a transmitter and a receiver so that Doppler effects or turbulent air or other corrupting effects may be detected, demodulating signals and checking for coding or modulations designed to ensure signal integrity, or other techniques.

Embodiments of hair cutting device 140 may also include cameras to collect images or video of user 102 and positioning device 108, so that analysis of those images or video may be used in computation of the position and/or orientation of hair cutting device 140 relative to user 102. Images or video from camera 106, cameras on positioning device 108, cameras on hair cutting device 140, or other cameras that may be utilized in some embodiments, may also be used in some embodiments to aid in determination of the position and/or orientation of hair cutting device 140 relative to user 102. Camera images from cameras in an automated hair cutting system 100 may also be displayed on electronic computing device 104 to aid user 102 in cutting their hair. Krenik '856 provides additional explanation of the very wide range of signal types, signal coding, signal modulation, types of transducers that may be used to generate and/or sense these signals, and many other aspects for various embodiments of signals, interfaces, cameras, sensors, illumination sources, and other elements or signals for automated hair cutting system 100.

Figure 2A:
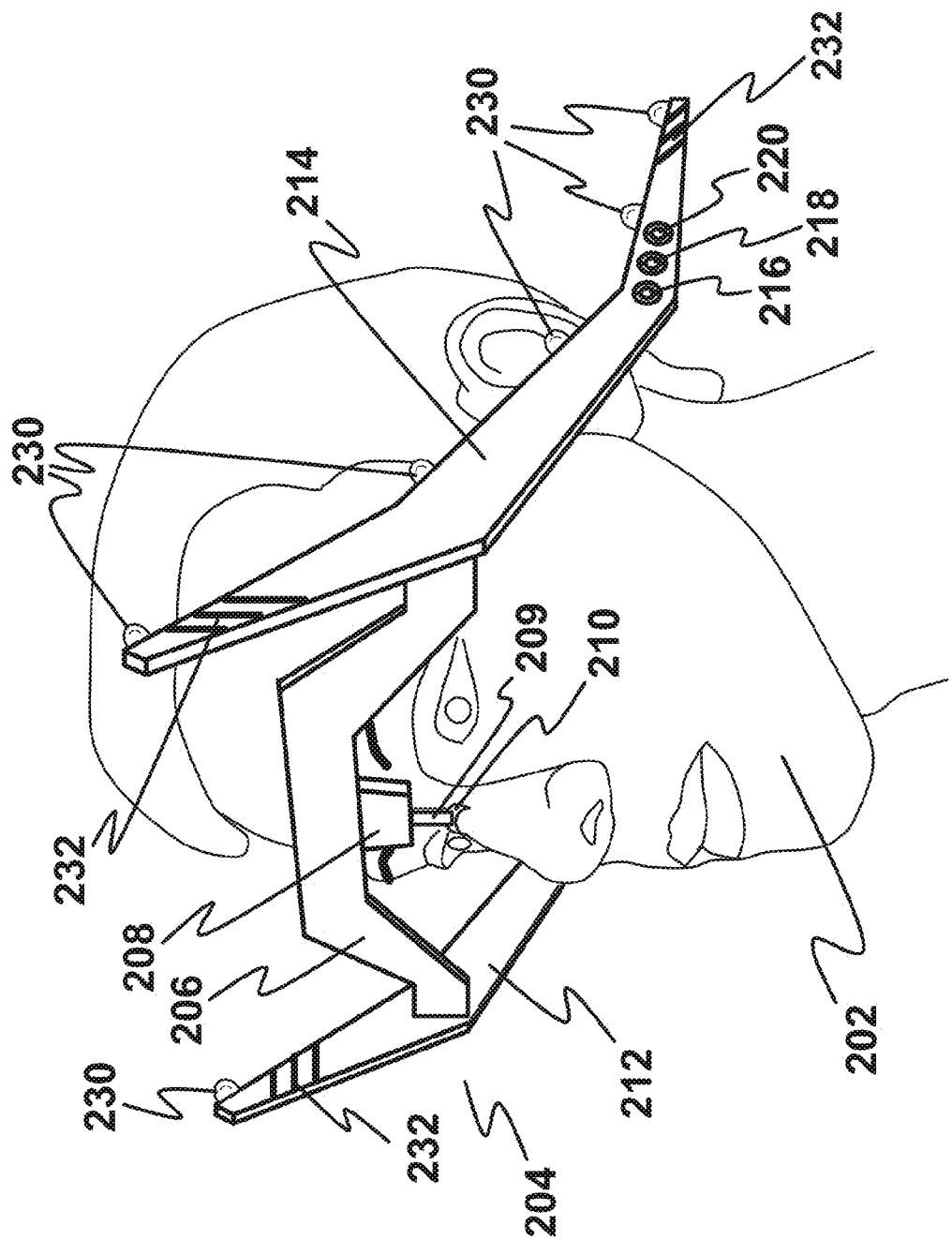
FIG. 2A shows a perspective view of one embodiment of a positioning device according to the present disclosure.

In FIG. 2A, a perspective view of an embodiment of a positioning device 204 being worn by a user 202 is shown. Positioning device 204 comprises a frame which may comprise a front frame 206 and two side frames such as left side frame 214 and right side frame 212. A support member 209 for supporting the frame on the user's nose may comprise a support mount 208 and nose support 210. The right side frame 212 and left side frame 214 may comprise a plurality of positioning interfaces 230 positioned at various points. The positioning device 204 may be supported on the user's ears by ear supports; therefore, the right side frame 212 and left side frame 214 may also comprise a front ear support hole 216, middle ear support hole 218, and back ear support hole 220.

Positioning device 204 is designed to provide access for a hair cutting device to collect and cut user's 202 hair, while positioning interfaces 230, positioning signals, and possibly other functions assist in allowing the position and/or orientation of the hair cutting device to be determined relative to the head of user 202. Positioning interfaces 230 may perform the same functions as the positioning interfaces 110 shown in the embodiment of positioning device 108 shown in FIG. 1, and described in Krenik '856. Positioning interfaces 230 are shown as small domes mounted on left side frame 214 and right side frame 212 and may contain antennas, microphones, transmitters, speakers, transducers, electronics, cameras, other sensors, wiring, and other functions. Positioning interfaces 230 are shown on positioning device 204 distributed along the top surfaces of right side frame 212 and left side frame 214. Some embodiments of positioning device 204 may also include positioning interfaces 230 on front frame 206 and on other surfaces and positions on the side frames. Positioning interfaces 230 in FIG. 2A are shown as hemispherical domes, but other shapes and configurations are possible. Many possible shapes and sizes of positioning interfaces may be used. In particular, square, rectangular, trapezoidal, faceted, triangular, and flat positioning interfaces are all possible. For the case of flat positioning interfaces, the internal structure of the antennas, sensors, transducers, speakers, cameras, microphones, or other internal elements may be housed inside the side frame to which the positioning interface is mounted so that only a flat cover may be visible. In some embodiments, positioning interfaces may be housed entirely in front frames or side frames so that no external features or evidence of positioning interfaces are visible. As an example, positioning interfaces including antennas may have antenna elements molded inside side frames or front frames so that there are no visible features associated with them when a positioning device 204 is observed. Positioning interfaces such as positioning interfaces 230 shown in FIG. 2A, or other possible embodiments of positioning interfaces may be directed so the signals they produce or receive, propagate in preferred directions for operation of an automated hair cutting system 100.

Stripes 232 or other easily visible and discernible features may be included in some embodiments of positioning devices 204. Stripes 232 are shown as black lines in FIG. 2A and may be formed as decals, stickers, painted on stripes, or may be otherwise formed or applied. Stripes 232 may provide a reference in images or video taken of user 202 and positioning device 204 which may be used in determining the position and/or orientation of a hair cutting device relative to positioning device 204. Note that stripes on the front outsides of the side frames (including left side frame 214 and right side frame 212) are substantially vertical; stripes on the front insides of the side frames are substantially horizontal; stripes on the back outside of the side frames slant substantially forward and up; and stripes on the back inside of the side frames slant substantially backward and up (see FIG. 2B to view the back inside of a side frame). By applying stripes 232 in different orientations as shown in FIG. 2A at different locations on positioning device 204, the stripes may be more easily discernible for some computer vision algorithms. Stripes in all of these noted positions are not visible in FIG. 2A, but review of positioning device 204 in FIG. 2A, FIG. 2B, and FIG. 2C will make clear how stripes may be applied. Computer vision algorithms may provide enhanced performance if easily visible and discernible features such as stripes 232 are provided for analysis. In addition to the simple black and white stripes 232 shown in FIG. 2A, other shapes including circles, squares, triangles, and any possible other shapes may be used. Stripes and other shapes may be of various colors or color combinations. And stripes and other shapes may appear on front frames as well as side frames and may appear in many additional locations to those shown for positioning device 204.

Some embodiments of positioning devices may be designed to benefit from illumination with structured light, colored light, laser light, invisible light, or other types of illumination. Observation of a positioning device 204 with a camera to aid in the determination of position and/or orientation of a hair cutting device may also include direct observation of a user 202 so that head and facial features of user 202 may be observed directly and analyzed. Positioning interfaces 230 may include cameras, and in some embodiments, additional cameras may be mounted on a positioning device 204.

Nose support 210 is attached to nose support member 209 which extends downward from nose support mount 208. Nose support 210 contacts the nose of user 202 to provide support to positioning device 204. Nose support member 209 may be adjustable and may extend from or retract into nose support mount 208 so that nose support 210 may be adjusted vertically in height to accommodate various facial sizes of users. Nose support 210 may include padding to improve comfort for user 202 and may include coatings, pads, texturing or other finishes to reduce the likelihood that nose support 210 might slip on the nose of user 202. Antibacterial coatings, adhesives, and other possible coatings or finishes on nose support 210 are also possible. Nose support 210 in FIG. 2A is shown as a flat piece of material, but those skilled in the art will recognize that many different embodiments of nose supports are possible. Nose support 210 may be fabricated from metals, plastics, rubber, ceramics, other materials or combinations of materials. Nose supports found on commonly available products such as eyeglasses, safety glasses, and other products may be adapted, in many cases, for use as nose supports for various embodiments of positioning devices 204.

Right side frame 212 and left side frame 214 may comprise ear support holes such as front ear support hole 216, middle ear support hole 218, and back ear support hole 220. The various ear support holes 216, 218, and 220 enables ear supports to be mounted at different positions to accommodate users with different sizes of heads. Such an ear support would extend to the ears of user 202 to support positioning device 204. Ear support 260 is visible in FIG. 2B and FIG. 2C, and will be described in more detail with regard to FIG. 2B and FIG. 2C.

Figure 2B:
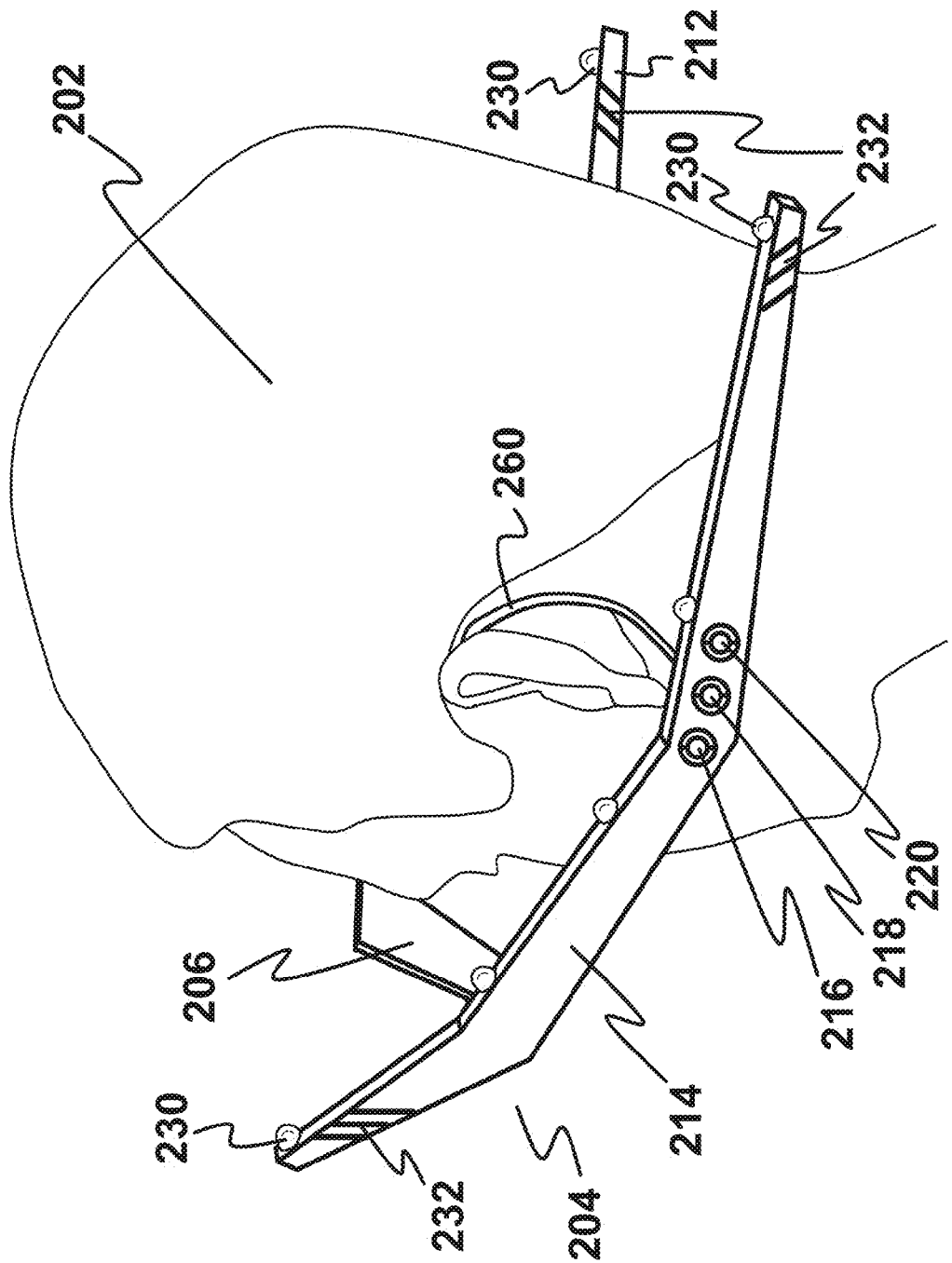
FIG. 2B shows an alternative perspective view of the embodiment of the positioning device shown in FIG. 2A.
Figure 2C:
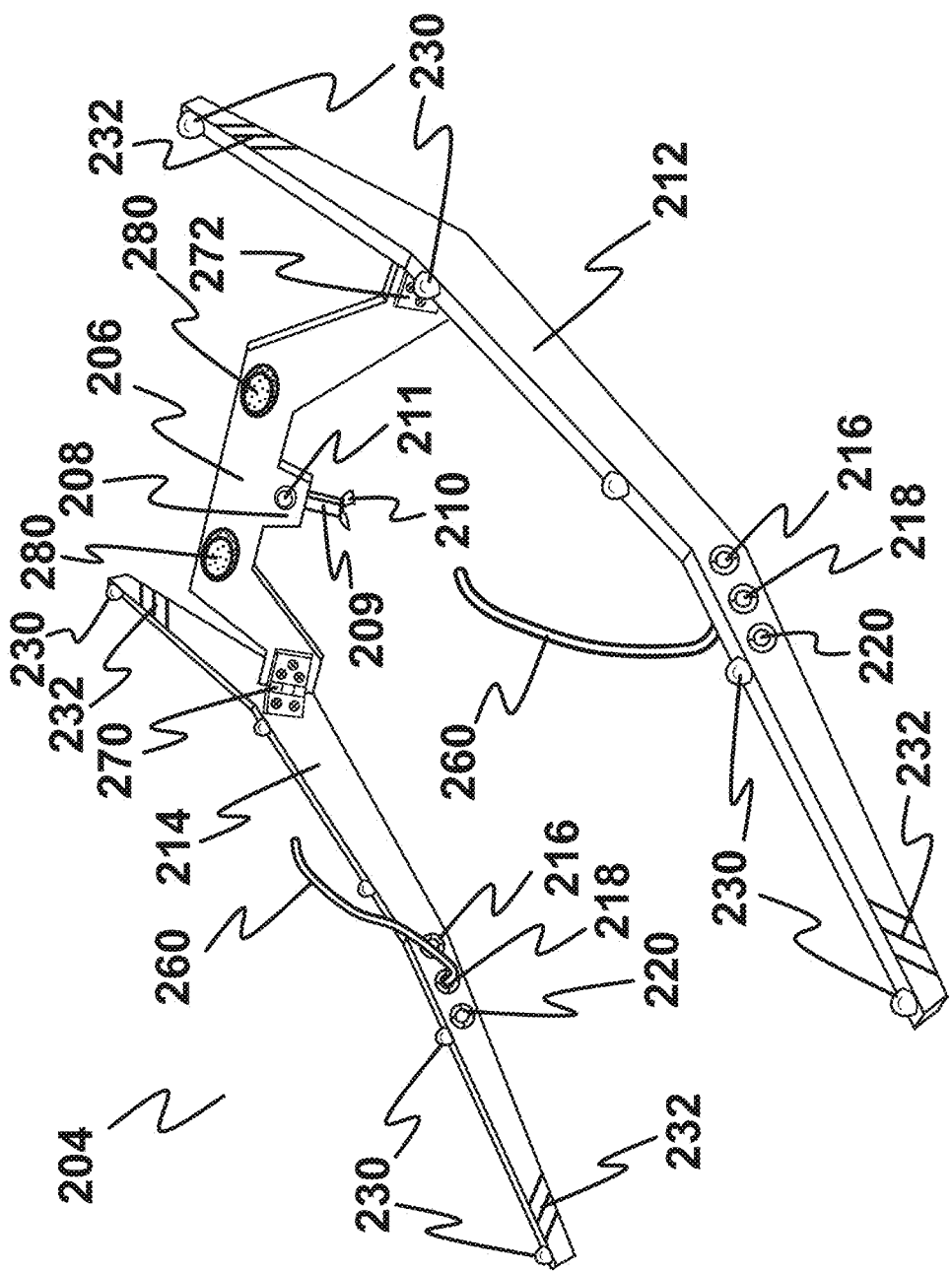
FIG. 2C shows another perspective view of the embodiment of the positioning device shown in FIG. 2A and FIG. 2B.

Front frame 206, right side frame 212, and left side frame 214 may be coupled to each other with hinges as shown in FIG. 2C Other possible ways to couple the frames together may include glue, adhesives, screws, bolts, and other possible mounting techniques. Further some embodiments of positioning device 204 may comprise a single frame formed in a single manufacturing operation. Front frame 206, right side frame 212, and left side frame 214 may be fabricated from plastics, metals, wood, laminated materials, composites, combinations of materials, or other materials. Positioning device 204 may have a similar construction and general form to a pair of eyeglasses, sunglasses, or safety glasses, and may accordingly, be manufactured using similar processes and materials. Some embodiments of positioning device 204 may be designed for more rugged or professional use and may benefit from use of bumpers on the end tips of the side frames of positioning device 204. Such bumpers may be formed from rubber or other compliant materials and may protect positioning interfaces 230, side frames, and other elements of positioning device 204. Additional use of compliant materials, flexible members, bumpers, and other features to support rugged or professional use are also possible.

Front frame 206 may be configured in some embodiments of positioning device 204 so that user 202 may wear eyeglasses in the course of operation of an automated hair cutting system. While front frame 206 is shown having a flat configuration, other designs and shapes may be used such that a user may wear eyeglasses or other various accessories during use. Likewise, the nose support member 209, nose support 210, and nose support mount 208 may be configured to accommodate eyeglasses worn at various positions on the nose. Nose support member 209, nose support 210, and nose support mount 208 may not be used in some embodiments in which front frame 206 may contain features that contact the forehead of user 202 (such as a forehead rest or band). Front frames may also include features designed to contact a user's nose, forehead, eye sockets, temples, cheeks, or other facial features. Embodiments are also possible in which use of nose support member 209, nose support 210, and/or nose support mount 208 is optional, and nose support member 209, nose support 210, and/or nose support mount 208 may be removed or installed as a matter of preference of a given user.

Figure 4:
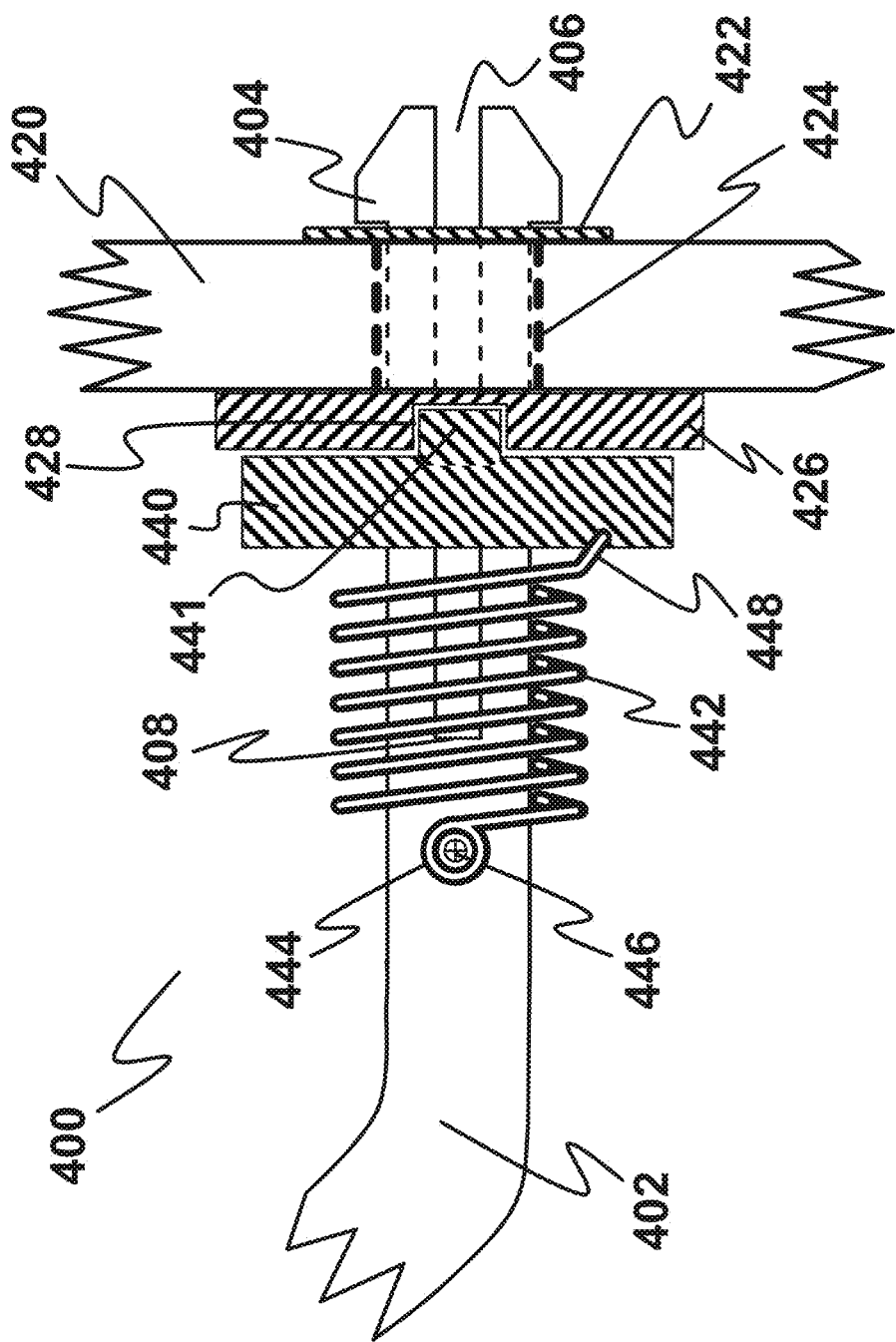
FIG. 4 shows a top view of a portion of an ear support which may be used with embodiments of positioning devices according to the present disclosure.

FIG. 2B shows positioning device 204 from the back and left side of user's 202 head. Ear support 260 is visible around the back of the left ear of user 202. Ear support 260 may be inserted in front ear support hole 216, middle ear support hole 218, or back ear support hole 220, to accommodate users with different head sizes. Some embodiments of positioning devices may include ear support holes arranged both vertically and/or horizontally on a side frame in addition to the horizontal arrangement of ear support holes shown on positioning device 204. Ear support 260 may be made from metals, plastics, wire, loops of cord, flexible materials, rigid materials, other materials, or combinations of materials. Ear support 260 may be solidly fixed in an ear support hole or may be moveably coupled therein. For example, the ear support may pivot in an ear support hole thereby enabling a custom fit according to various head sizes of users. Latches, set screws, detents, cam locks and a wide variety of other such mechanisms may be utilized to allow the angle of pivot of an ear support 260 in an ear support hole to be adjusted. Further, the ear support may be coupled via a spring support mechanism as shown in FIG. 4, which provides pressure against the back of the ears of user 202 to provide enhanced stability and support to positioning device 204.

A wide range of shapes of ear support 260 are possible. Some embodiments of ear support 260 may hook over the tops of the ears of a user and others may only contact the back of the ears of user 202. Still others may fully encircle the ears of user 202, and alternative designs are also possible. Ear support 260, as shown in FIG. 2B, extends behind and partially over the ears of user 202 from the back. Embodiments in which ear supports extend over the ears from the front are also possible, as are ear supports that fit into the ears or contact the inner parts of the ear as opposed to hooking over the ears. Accordingly, various ear supports such as those utilized in conjunction with eyeglasses, headsets, headphones, and the like may be utilized without departing from the utility and intent of supporting the positioning device 204 on the ears of a user without interfering with hair and hair cutting operations. Positioning device 204 includes a plurality of ear support holes, and although the shown embodiment uses three holes, other embodiments may comprise a greater or fewer number, as well as utilize various shapes, locations, and dimensions of support holes.

Other embodiments of ear supports are possible that may operate in other ways versus being fitted into ear support holes. Ear supports that slide in slots made in positioning device side frames, ear supports that are adjustable along a track or channel formed in or mounted on a side frame, or other possible embodiments are possible. It is also possible for an entire section of a side frame, including an ear support, to move or slide on a track or other guide so that the position of an ear support may be adjusted to better fit a variety of users. For example, an embodiment of positioning device 204 may include the ability for the portion of left side frame 214 and right side frame 212 including ear supports 260 to extend rearward or frontward along the sides of the head of user 202 on a track, slide, guide, telescoping structure, or other possible structure and to be locked in place at various levels of extension with a catch, latch, cam, or other suitable mechanism. Other forms of side frames that have adjustable length are also possible. An array of embodiments and options for adjustments of ear supports are possible.

FIG. 2C shows another perspective view of positioning device 204. Both ear supports 260 are visible in FIG. 2C and both are mounted in the middle ear support holes 218 of left side frame 214 and right side frame 212. FIG. 2C shows forehead pads 280 that may be utilized on some embodiments of front frame 206. Forehead pads 280 may be made from felt, rubber, foam rubber, leather, plastics, or other materials and may provide additional stability to the forehead of user 202 so that the stability of positioning device 204 on the head of user 202 may be improved. Alternative embodiments of positioning device 204 may include a forehead pad that extends along the width of front frame 206 instead of two individual forehead pads 280. Such a forehead pad, head band, or other possible forehead support may be used in place of or in addition to forehead pads 280. FIG. 2C shows two forehead pads above and to the right and left of nose support mount 208, but additional forehead pads may be used in some embodiments.

The view of positioning device 204 in FIG. 2C also shows left hinge 270 and right hinge 272. Left hinge 270 mounts left side frame 214 to front frame 206. Right hinge 272 mounts right side frame 212 to front frame 206. Left hinge 270 and right hinge 272 allow positioning device 204 to be folded much like a pair of eyeglasses, as will be further explained with regard to FIGS. 3A and 3B. Left hinge 270 and right hinge 272 are shown in FIG. 2C as common hinges that may be formed from metals, may have two parts that each interlock a common axle, and may be mounted with screws to front frame 206 and their respective side frames. Those skilled in the art will recognize that a very wide range of hinges including hinges embedded in front frames and side frames, hidden hinges, inlayed hinges, hinges formed from plastics, hinges formed from flexible materials that bend along a preferred axis, and any other type of suitable hinge may be applied to positioning devices. Hinges used in positioning devices may be mounted with screws, bolts, adhesive, glues, or by any other suitable technique. Some embodiments of left hinge 270 and right hinge 272 may include springs in the manner than many common eyeglasses include hinges with spring functions inside them or attached to them. Springs inside left hinge 270 and right hinge 272 may serve to provide a suitable level of pressure from ear supports 260 to the sides of the head of a user 202 to improve comfort, fit, and/or stability of positioning device 204. Springs inside left hinge 270 and right hinge 272 may also allow left side frame 214 and/or right side frame 212 to be over-extended past a right angle between them and front frame 206 without causing excessive stress or damage to positioning device 204 (many eyeglasses available today include spring hinges to allow the side frames to be over extended without causing damage as well, implementation in a positioning device may be in a similar fashion). Springs inside left hinge 270 and right hinge 272 may have a limited range of spring force, and left hinge 270 and right hinge 272 may have some range of motion over which no spring force is applied, but may contain a suitable mechanism so that spring force is encountered over only some limited portion of their total range of motion, such as those used in the construction of eyeglasses.

Nose support member 209 may further comprise nose support adjustment button 211. Nose support adjustment button 211 may be depressed to allow nose support member 209 to slide vertically in nose support mount 208 so that nose support 210 may be adjusted in height. Nose support adjustment button 211 may be released to substantially fix nose support member 209 in place. Nose support adjustment button 211 may be configured in various embodiments to be on the side of front frame 206 away from user 202 as opposed to on the side of front frame 206 nearest user 202 as shown in FIG. 2C. Those skilled in the art will also recognize that a very wide range of mechanisms, levers, buttons, configurations, etc. are possible for an adjustable nose support. The internal construction for an adjustable nose support is not shown in the present disclosure as very many alternatives involving levers, springs, buttons, gears, gear teeth, flexible materials, rigid materials, and many other alternatives are well established and will be clear to those skilled in the art.

A key benefit to embodiments of positioning devices such as positioning device 204 as shown in FIGS. 2A-2C is that front frame 206 may provide a substantially rigid dimension across its length and left hinge 270 and right hinge 272 may substantially securely adjoin left side frame 214 and right side frame 212, respectively, to front frame 206. The rigid and secure structure of front frame 206 and the areas of the side frames near front frame 206 may allow the relative locations of positioning interfaces 230 on the front portions (near to front frame 206) of the side frames to be substantially fixed and known. The structure of front frame 206 need not be perfectly rigid, but only sufficiently rigid so that the relative locations of the positioning interfaces on the front portions of the side frames are sufficiently accurately established for use in an automated hair cutting system 100. Hence, a user 102 may be directed to center and align positioning device 204 to the front of their face (possibly while looking into a mirror) so that the positioning interfaces 230 near front frame 206 may be assumed to be substantially symmetrically distributed and in level alignment to user's 102 face. This may be followed with some calibration of the locations of the positioning interfaces 230 further away from front frame 206 based on a small number of dimensions that may be easily determined. These calibrations will be further described with reference to FIGS. 10-13. The ability to quickly and easily align positioning device 204 to user's 102 facial features and perform calibrations so that the relative locations of positioning interfaces 230 may be computed is highly beneficial.

Figure 3A:
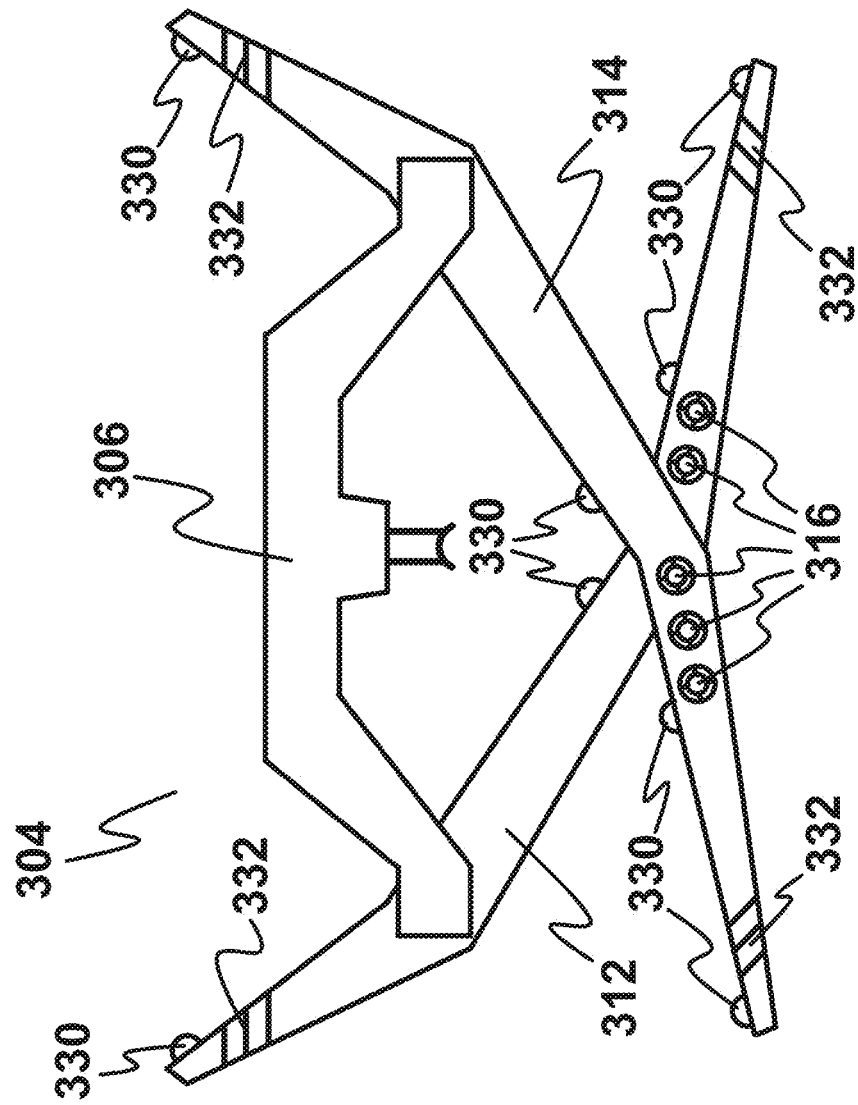
FIG. 3A shows another embodiment of a positioning device according to the present disclosure, shown folded for compact storage.

FIG. 3A shows a front view of an embodiment of positioning device 304. Positioning device 304 is shown folded into a substantially flat form. Left side frame 314 and right side frame 312 have been folded at hinges connecting them to front frame 306. Ear support holes 316 on left side frame 314 and right side frame 312 may partially overlap as shown so that if ear supports 360 were in place, they might interfere with the folding of positioning device 304. Placement and orientation of the hinges securing front frame 306 to the side frames may be altered in some embodiments so that left side frame 314 and right side frame 312 cross in such a way that ear support holes 316 substantially don't overlap—that is, the axis of the hinges may be configured so that left side frame 314 and right side frame 312 cross at a different point along the length of left side frame 314 and right side frame 312 so that ear support holes 316 are not blocked. Ear support hole locations, the size or shape of ear supports, and/or the shape or size of side frames may also be designed for some embodiments of positioning devices so that ear support holes don't problematically overlap when a positioning device is folded.

Figure 3B:
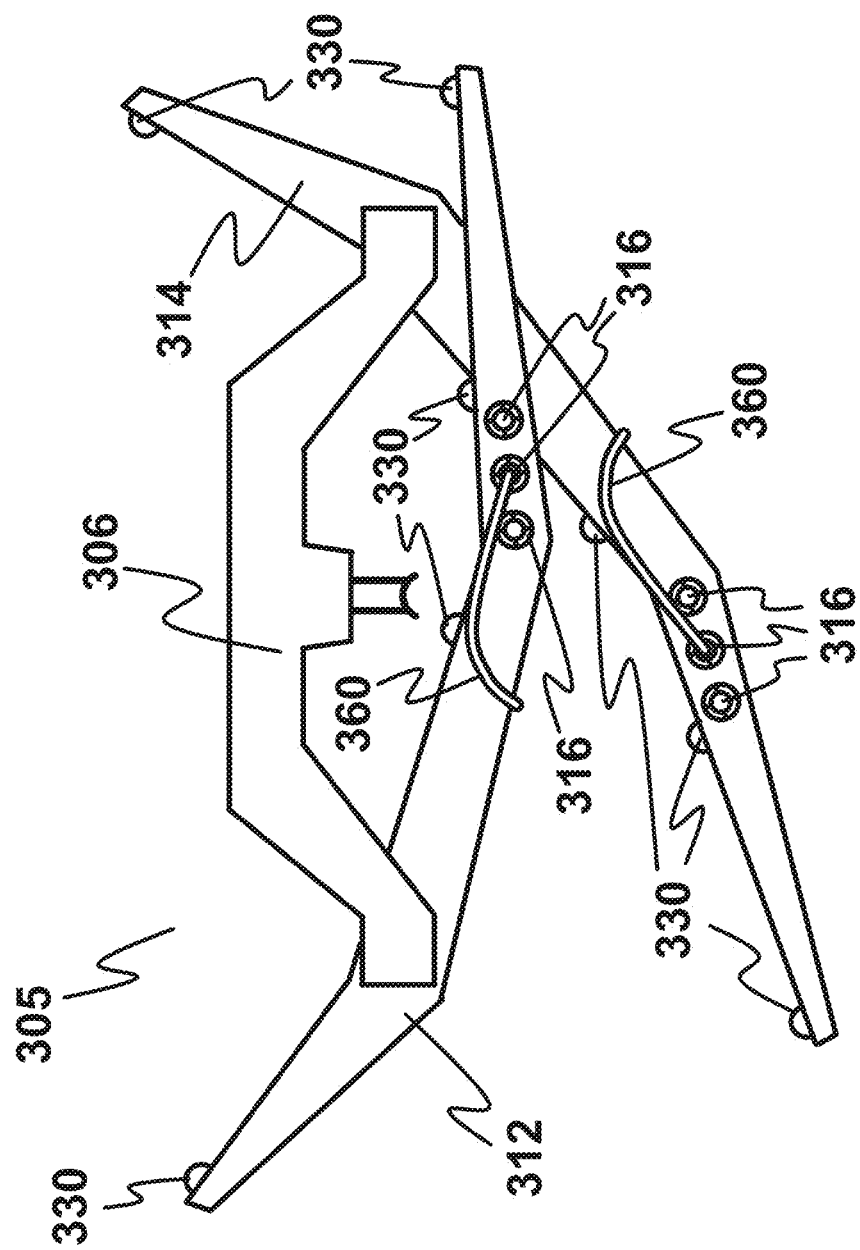
FIG. 3B shows another view of an embodiment of a positioning device according to the present disclosure.

FIG. 3B shows another embodiment of a positioning device 305, but having hinges configured so that the axis of its left side hinge and right side hinge are different from each other. Like numbered elements in FIG. 3B perform the same functions as those so numbered in FIG. 3A. In FIG. 3B, use of different hinge axes allows right side frame 312 and left side frame 314 to cross in such a manner when positioning device 305 is folded that ear supports 360 may be present and not substantial interfere with the side frames. Ear supports 360 have been pivoted forward so that they lay over the side frame they are attached to. Some embodiments may allow ear supports to be pivoted in this fashion and such embodiments may include mechanical stops and/or catches that make it substantially easy to pivot ear supports 360 forward. Detents, spring loaded catches, springs, motion limiting stops, and other common techniques may be used to allow ear supports to be quickly and easily positioned for folding of positioning device 305 and to easily allow ear supports 360 to be folded back for use when positioning device 305 is unfolded for use.

Positioning device 304, positioning device 305, and other positioning devices shown in the present disclosure demonstrate only a few of the very many ways that hinges, pivots, flexible members, telescoping members, and other techniques may be applied to allow a positioning device to be folded or otherwise compacted for storage, or adjusted in size or shape. Front frames and side frames may contain multiple hinges and may fold or articulate in numerous ways. While side frames in the present disclosure uniformly fold inwards and across each other (across the back of front frames), it is also possible to fold one or both side frames in the opposite way so that they are closest to the front of front frame (the side opposite a user's face when being worn) when folded. Embodiments utilizing hinges, pivots, telescoping members, flexible members, folding members, articulating members, sliding tracks, and other techniques to allow compacting for storage or adjustment of the size or shape of a positioning device are possible. Likewise, catches, latches, pins, springs, detents, cams, magnetic catches, magnetic latches, and other techniques to adjust or secure elements of a positioning device are also possible.

FIG. 4 shows a top view of an embodiment of an ear support 400 fitted into an ear support hole 424. The ear support 400 shown in FIG. 4 includes a slotted shaft 402 that extends through an ear support hole 424 in side frame 420. Ear support hole 424 may function as ear support holes described in previous figures and may be one of multiple ear support holes in side frame 420. Ear support hole 424 may be a simple hole cut, drilled, or otherwise formed in side frame 420 or may be lined with metal, ceramic, plastic, grommets made from various materials, or other materials. Outer grommet plate 422 may provide a more rugged or hardened surface against which stop feature 404 may rest. Stop feature 404 is a larger diameter feature around slotted shaft 402 that snaps open once it emerges from ear support hole 424 when ear support 400 is inserted into ear support hole 424. The slot 406 in slotted shaft 402 is of sufficient length to allow slotted shaft 402 sufficient flexibility so that stop feature 404 may be compressed sufficiently to fit through ear support hole 424 and then spring back substantially to its initial, "regular" shape before compression. Slot end 408 in slotted shaft 402 is shown inside rotary spring 442, but alternative embodiments may use longer or shorter slots 406 in slotted shaft 402. Stop feature 404 includes a tapered end so that it may more easily be inserted into and through ear support hole 424. Inner face plate 426 is positioned on the inside of side frame 420 and is substantially rigidly affixed to side frame 420. Some embodiments may form inner face plate 426, a liner inside hole 424, and outer grommet plate 422 as a single element (such as a grommet) made from metals or other materials that may be molded into side frame 420 during fabrication. Alternatively, inner face plate 426, a liner inside hole 424, and outer grommet plate 422 may be formed separately and then welded or otherwise affixed to each other; or they may simply be affixed to side frame 420 and not affix to each other directly. Inner face plate 426 includes one or more channels 428 extending into its surface. Channel 428 is formed to mate with a tab 441, as shown and formed on spring support plate 440, when slotted shaft 402 is seated in ear support hole 424. Spring support plate 440 mates with inner face plate 426 and slotted shaft 402 is maintained in ear support hole 424 through the effect of stop feature 404. Slotted shaft 402 extends through a hole in spring support plate 440 that is sufficiently large that spring support plate 440 may rotate freely on slotted shaft 402. In some embodiments, a ball bearing or other bearing may be used in spring support plate 440 instead of a simple hole so that spring support plate 440 may more easily and consistently rotate on slotted shaft 402. Spring support plate 440 attaches to rotary spring 442 through spring plate attachment 448. Spring plate attachment 448 may be a weld, a screw through a hole, a pin, a rivet, or other suitable attachment that affixes spring support plate 440 to rotary spring 442. The end of rotary spring 442 opposite spring plate 440 is affixed to slotted shaft 402 through spring shaft attachment 444 and screw 446. Rotary spring 442 may be coupled with slotted shaft 402 by other techniques such as welding, bolts, pins, rivets, adhesive, glue, and other possible techniques. Spring shaft attachment 444, screw 446, and spring plate attachment 448 affix rotary spring 442 to slotted shaft 402 and spring support plate 440 in such a manner that rotary spring 442 exerts rotational spring force on spring support plate 440 as it is rotated on slotted shaft 402. Although slotted shaft 402 is shown extending upward and to the left, slotted shaft 402 may extend beyond the left side and the top side of FIG. 4 and would be formed, as shown in FIG. 2C to form a curved hook or other feature suitable for an ear support.

Many alternative constructions are possible to create a shaft that is removable from a hole and configured so that rotary spring force is exerted through at least some portion of rotation of the shaft in the hole, including, but not limited to the use of pins, clips, screws, bolts, fasteners, or other techniques which allow a removable shaft. Further, embodiments utilizing telescoping shafts, shafts sliding in sleeves, shafts adjustable along a track or guide, and other possible constructions to achieve similar benefit without the need to remove such a shaft are also possible. The use of a channel 428 on inner face plate 426 to mate with the tab 441 on spring support plate 440 may be replaced with interlocking teeth, pins, high friction surfaces, adhesive surfaces, or many other possible techniques. And the effect of rotary spring 442 may be achieved with metal springs, elastic materials, extension springs, compression springs, cams, and other techniques. A shaft with a sleeve fitted to slide over it may allow an ear support to pivot and possibly to also have a spring function without the ear support actually rotating directly in a round ear support hole. Many embodiments for ear supports and ear support holes or other mounts for ear supports are possible.

The embodiment of ear support 400 shown in FIG. 4, or other embodiments of ear supports offering similar functionality, may provide significant benefit for some embodiments of positioning devices, such as positioning device 204. Rotational spring force may be configured so that a preferred idle or rest position of an ear support may be aligned with a side frame as shown for ear supports 360 in FIG. 3B, or in other orientations for various possible embodiments. Ear supports 400 may be rotated back behind the ears of a user 202 when a positioning device 204 is put on so that the positioning device 204 is easily and conveniently placed on the user's 204 head. And when a positioning device 204 is worn, ear supports 400 may apply a level of spring force to the back of user's 202 ears so that positioning device 204 is stable and comfortably mounted on user's 202 head.

Figure 5:
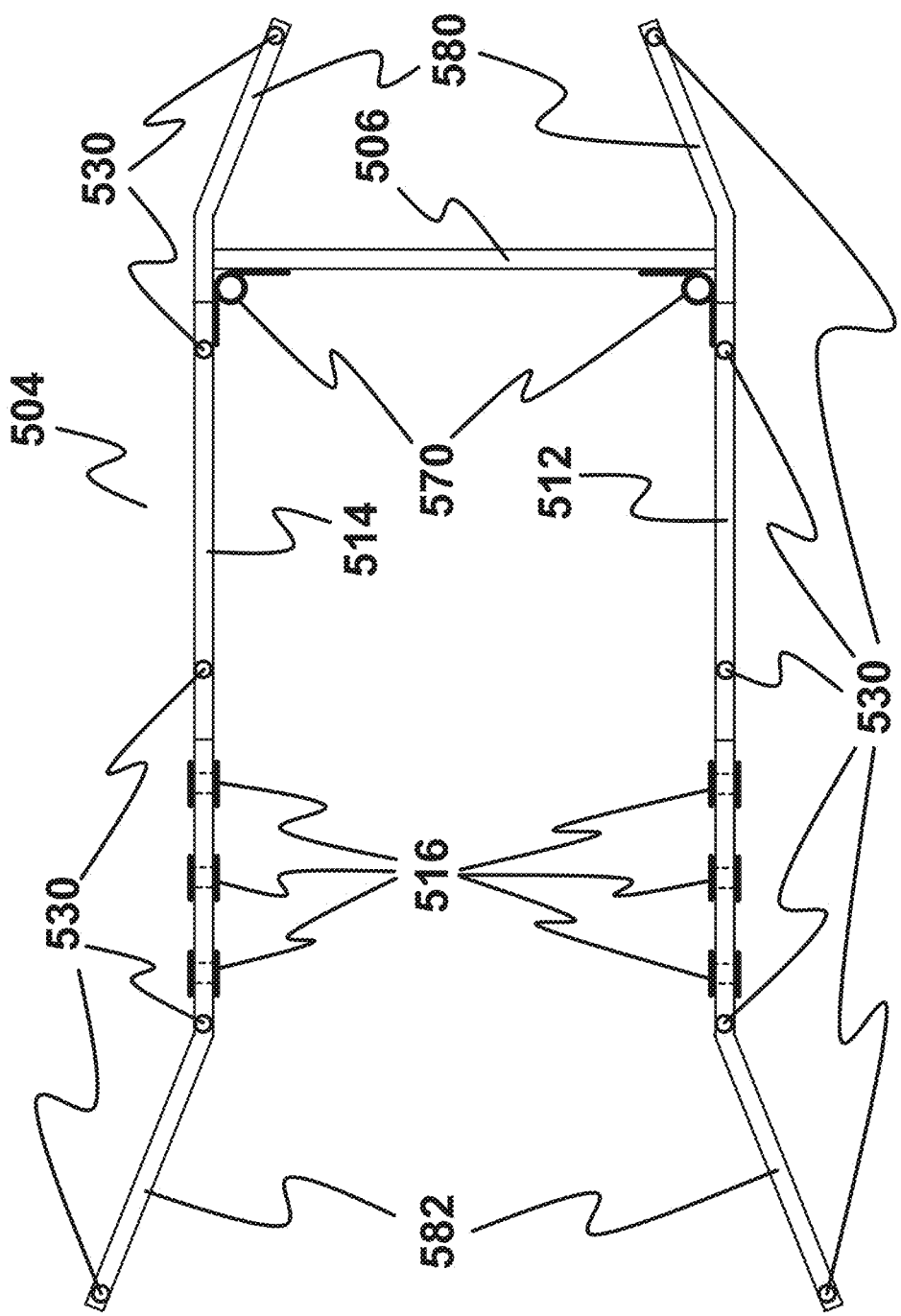
FIG. 5 shows a top view of another embodiment of a positioning device according to the present disclosure.

FIG. 5 shows a top view of an embodiment of a positioning device 504. The embodiment of positioning device 504 includes side frame front sections 580 that are oriented inwards, toward the center of the forehead of a user who would wear it, and side frames back sections 582 that are oriented outwards away from the back of the neck of a user who would wear it. Orienting side frame front sections 580 inward enables the positioning interfaces 530 at the front ends of a side frame to have a less obstructed path to a hair cutting device positioned on the opposite side of a user's head. In this way, side frame front sections 580 may be shorter than they might otherwise need to be for a given embodiment, leading to a smaller overall positioning device that is lighter and uses less material to construct. Orienting side frames back sections 582 outwards enables easier and less obstructed access for a hair cutting device to the back of a user's head, especially the back of a user's neck. While positioning device 504 is shown embodied with flat structures for front frame 506, left side frame 514, and right side frame 512, embodiments are possible in which rounded, contoured, bent, and otherwise specially formed structures may offer benefit. Benefits may include improved fit and/or comfort for users, reduced weight, greater rigidity and stability of a positioning device, the ability of a user to wear eyeglasses while wearing a positioning device, easier ability to maneuver a hair cutting device around a positioning device, less obstructed access to signals from positioning interfaces, improved styling of positioning devices to achieve a pleasing appearance for a positioning device, or other possible benefits. Some embodiments of positioning devices may adopt side frame front sections 580 and/or side frame back sections 582 that are fabricated from flexible materials so that the positioning device is less likely to be damaged if it is dropped on a floor or otherwise stressed.

Embodiments in which side frame front sections 580 and/or side frame back sections 582 are supported on hinges or pivots and may be positioned in a first position and/or orientation for some hair cutting operations and other positions for other hair cutting operations are also possible. For example, side frame back sections 582 may be adjusted further outward or possible inwards or in parallel with the main portion of the side frames they attach to. For such embodiments, sensors may be included in front frame 506 and/or the side frames so that changes in the relative locations of positioning interfaces 530 may be accounted for as the shape of positioning device 504 is changed, a user may provide information (perhaps through an electronic computing device) regarding the adjustment of the positioning device, or positioning interfaces 530 may be capable of sensing the dimensions between them so that movement of one or more positioning interfaces 530 in the course of adjustment of a positioning device may be sensed and accommodated. The ability, for example, to position side frame back sections 582 further to the back and away from the sides of a user's head while hair is cut on the sides of a user's head, and thereafter further outwards, enables hair to be more easily cut on the back of a user's head and neck. And as noted above, some embodiments of positioning devices 504 may include the ability for the positioning interfaces 530 to automatically sense the dimensions between them (or at least between those positioning interfaces that are not blocked by a user's head) so that if a small number of positioning interfaces are moved relative to the others that their relative locations may be determined and accounted for in the operation of a positioning device. Hence, positioning devices that allow some portion of their structure to be adjusted or modified, at least within some limited ranges or orientations that may be established by hinges, stops, pivots, articulating members, or other techniques, are possible. And changes to the locations of positioning interfaces of such positioning devices, may be accounted for automatically in some embodiments.

Certain embodiments of positioning devices may not utilize either or both side frame front sections 580 or side frame back sections 582 are not utilized so that the position and/or orientation of a hair cutting device may be suitably determined without use of side frame front sections 580 or side frame back sections 582. Some embodiments of hair cutting devices may include additional sensors such as cameras, accelerometers, orientation sensors (see FIG. 14 and FIG. 15), or other sensors that may allow positioning devices of reduced size or complexity to be utilized with them. And hair cutting devices that have larger numbers of positioning sensors or more broadly spaced positioning sensors about their structure may also work well with simplified or smaller positioning devices. Those skilled in the art will recognize that a wide range of sizes, shapes, number of positioning interfaces, and other variations in the design of positioning devices is possible.

Figure 6:
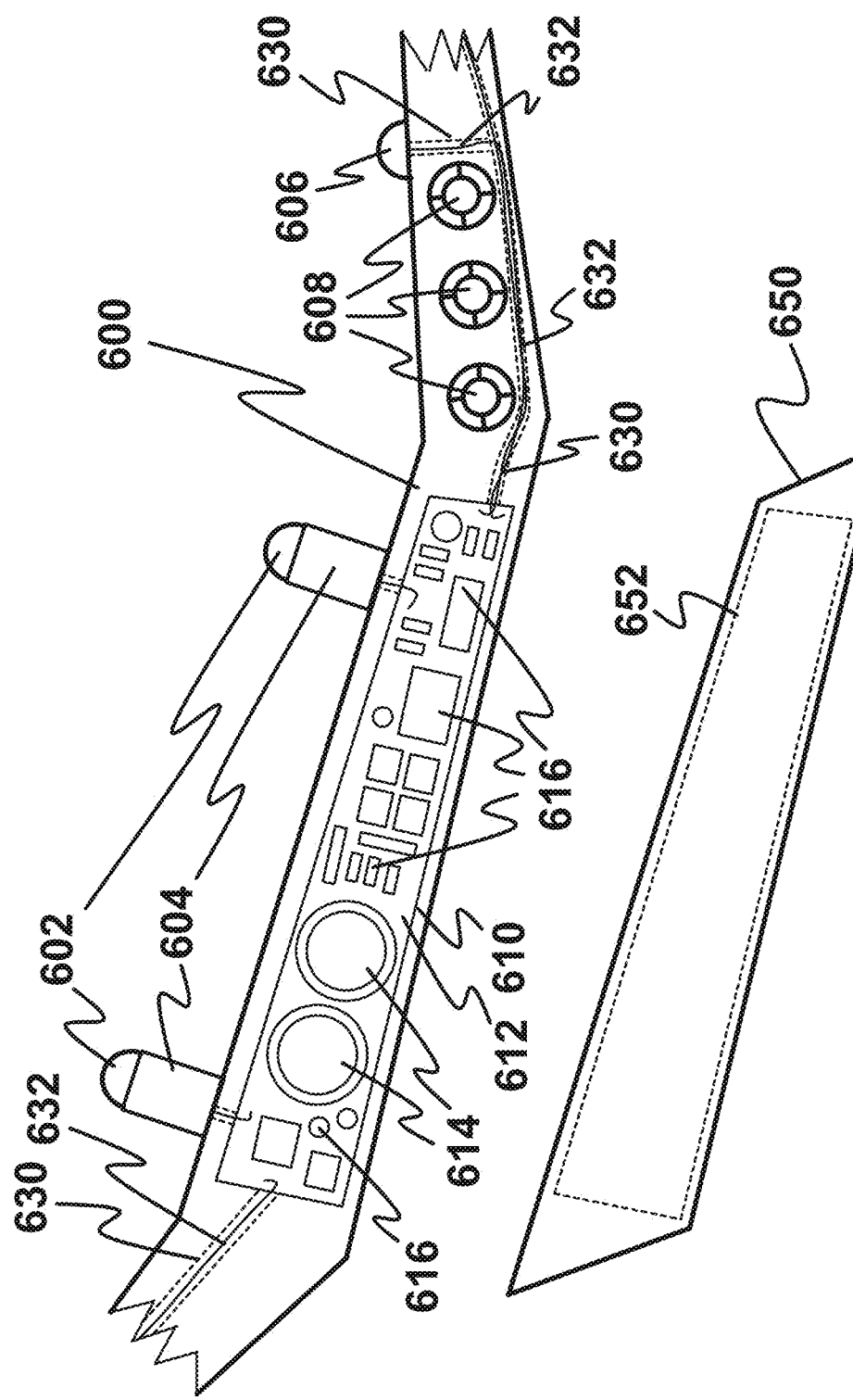
FIG. 6 shows a partial view of a side frame of one embodiment of a positioning device according to the present disclosure.

FIG. 6 shows a portion of a side frame 600 that includes a chamber 610 that houses an embodiment of a printed wiring board 612. Side frame 600 includes three ear support holes 608. Side frame 600 includes a positioning interface 606 and also includes positioning interfaces 602 mounted on posts 604. Positioning interfaces 602 perform the same functions as positioning interface 606 and the other positioning interfaces shown in the present disclosure. Posts 604 elevate positioning interfaces 602 above the top of side frame 600. Additional elevation of positioning interfaces 602 above side frame 600 enables users with long hair to drape some of their hair over side frame 600 during a haircut. Posts 604 with positioning interfaces 602 mounted above them may provide benefit in poking positioning interfaces 602 through and substantially above hair draped over side frame 600, reducing possible obstruction of positioning interfaces 602. Instead of using posts 604, side frame 600 could have features molded into it or otherwise formed to provide a similar benefit in elevating positioning interfaces 602.

Printed wiring board 612, may be a rigid printed wiring board, a flexible printed wiring board, or other type of wiring board. Printed wiring board 612 includes electronic components 616 and batteries 614. Batteries 614 are shown as round batteries (batteries such as these are sometimes referred to as "coin cell batteries"), but other embodiments may use cylindrical batteries or batteries of other shapes. Batteries 614 may be replaceable or may be soldered, welded, or otherwise fixed in place. Batteries 614 may also be designed for a single one-time-use discharge or may be rechargeable. Electronic components 616 may include microprocessors, computers, electronic memories, capacitors, resistors, inductors, power electronics, signal processing electronics, analog integrated circuits, digital integrated circuits, power integrated circuits, transistors, sensors, antennas, transducers, light emitting diodes, microphones, speakers, wireless interfaces, wired interfaces, wire, switches, or any other element or function that may support functionality of a given embodiment of a positioning device. Wiring channels 630 provide hollow tunnels inside side frame 600 that may allow wires 632 to pass between positioning interfaces 602, positioning interfaces 606, and printed wiring board 612. Positioning devices may include multiple printed wiring boards placed in and throughout various locations in any of the frames. Positioning devices may also include electronics or electrical functions mounted, affixed, or otherwise supported by the structure of the positioning device directly or through other intermediate structures.

Cover 650 may be mounted over chamber 610 on side frame 600 to protect the electronics and other elements contained in chamber 610. Cover 650 may be applied with glue, adhesive, ultrasonic welding, clips, screws, fasteners, or other techniques. Cover 650 may be applied as a substantially permanent structure that would not normally be opened after device manufacture, or may be configured as a removable cover.

Embodiments of positioning devices are possible in which plastics, potting compounds or other materials may be used to cover printed wiring board 612 and fill chamber 610 instead of or in addition to using cover 650. Other embodiments are possible in which printed wiring board 612 is molded directly inside side frame 600 when side frame 600 is formed, and some embodiments may even form side frame 600 using a printed wiring board fabrication process so that a printed wiring board is intrinsic in side frame 600 and side frame 600 is, essentially, formed from a printed wiring board. Various options for how to embed, mold, laminate, cover, pot, or otherwise form a side frame, front frame or other element of a positioning device with batteries, and/or electronic components, and/or wiring, and/or other functions within the side frame, front frame, or other element are possible.

Positioning device may have wiring, electronic components, and positioning interfaces on side frames, front frames, and other elements. Hence, wires may extend from a side frame, over or through a front frame, and into another side frame. Wiring may be pulled through hollow tunnels such as wiring channels 630 in the elements of a positioning device, may be laid in surface tracks or channels formed in those elements, or may be secured to the surface of those elements. Some embodiments may only include batteries and/or electronic components in one of the side frames of a positioning device 204. Such embodiments may benefit if ballast or weight is added to the side frame not containing batteries and/or electronic components so that the overall positioning device 204 balances substantially comfortably on the head of user 202. Those skilled in the art will recognize that the use of ballast, weights, special features, or special structures to provide the effect of ballast to selected areas of a positioning device to counter the weight of components, batteries, or other elements so that a positioning device 204 is balanced regardless of how components, batteries, or other elements are positioned may be possible for various embodiments.

Figure 7:
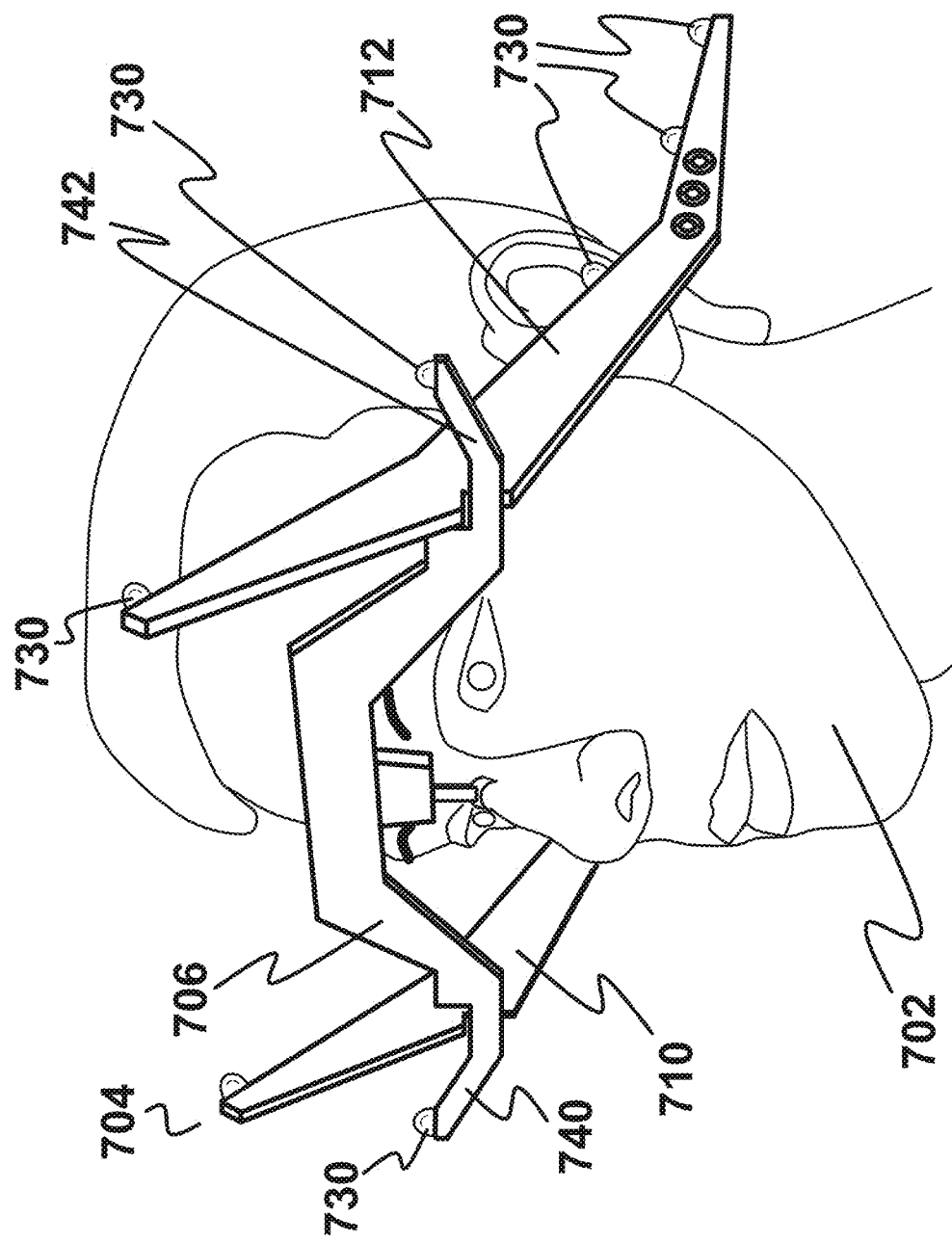
FIG. 7 shows a perspective view of another embodiment of a positioning device according to the present disclosure.

FIG. 7 shows a perspective view of an embodiment of a positioning device 704. Positioning device 704 is of similar construction and function to positioning device 204, however positioning device 704 also includes right front frame extension 740 and left front frame extension 742. Right front frame extension 740 and left front frame extension 742 extend front frame 706 laterally outward so that the positioning interfaces 730 mounted on right front frame extension 740 and left front frame extension 742 are extended further away from the sides of the head of user 702 than would be possible if these positioning interfaces 730 were located on right side frame 710 and left side frame 712. Some embodiments of a positioning device 704 may comprise positioning interfaces further away from the head of user 702, and therefore, incorporation of right front frame extension 740 and left front frame extension 742 may improve system positioning accuracy, reduce the number of positioning interfaces needed, or provide other benefits. The use of hinges to adjoin front frame 706 to left side frame 712 and right side frame 710 are possible with the incorporation of right front frame extension 740 and left front frame extension 742 as shown in FIG. 7. The use of hinges so that positioning device 704 may be folded for convenient storage may benefit from design of front frame 706, right front frame extension 740, left front frame extension 742, right side frame 710, and left side frame 712 so that the physical elements of front frame 706, right front frame extension 740, left front frame extension 742, positioning interfaces 730, right side frame 710, and left side frame 712 maintain adequate clearances and don't strike or interfere with each other as positioning device 704 is folded. Right front frame extension 740 and left front frame extension 742 as shown in FIG. 7 each support one positioning interface 730, but embodiments are possible in which multiple front frame 706 extensions are used, and/or in which various extensions to front frame 706 support multiple positioning interfaces 730.

Figure 8:
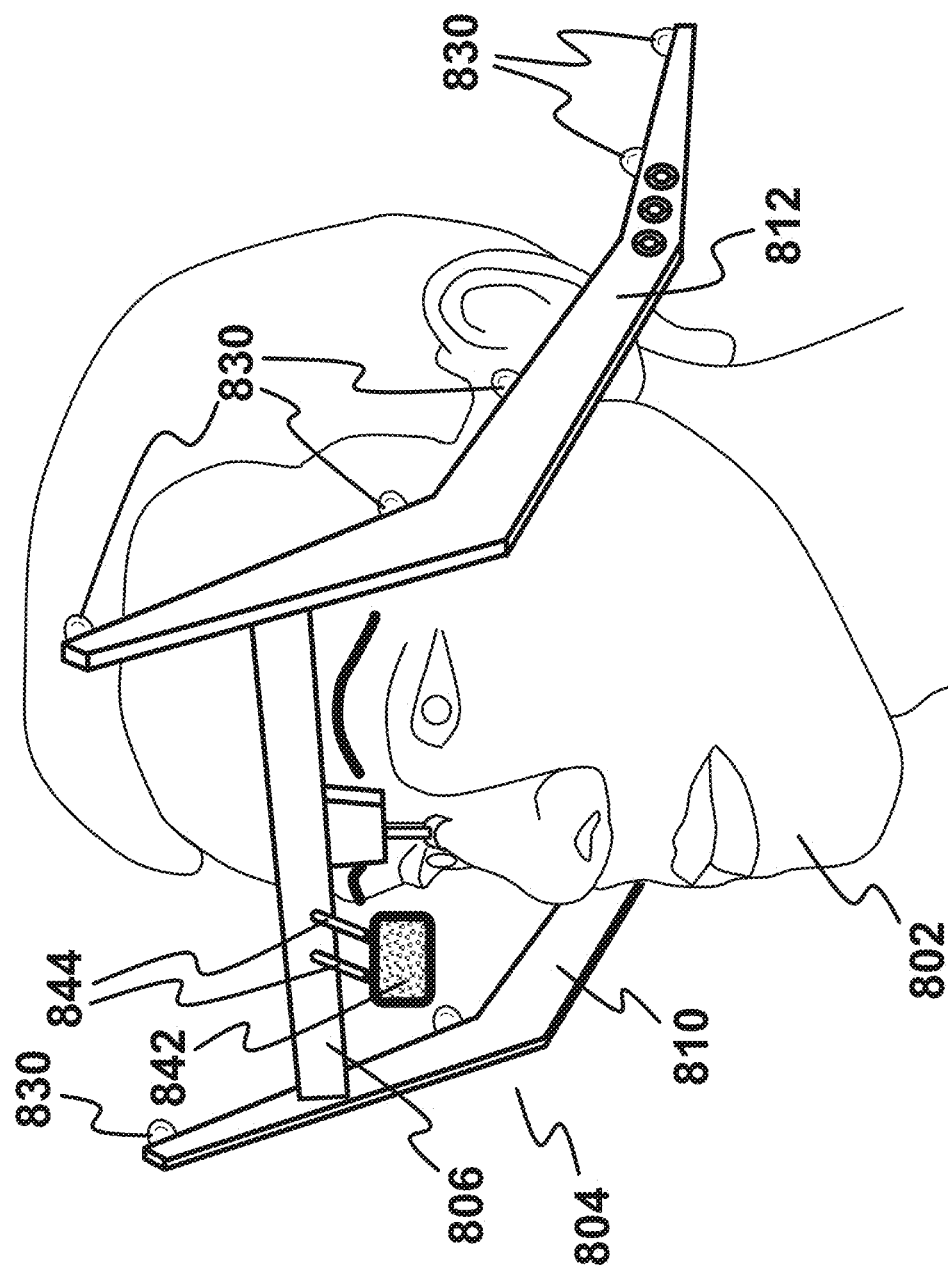
FIG. 8 shows a perspective view of yet another embodiment of a positioning device according to the present disclosure.

FIG. 8 shows a perspective view of an embodiment of a positioning device 804 that includes electronic display 842 mounted on display supports 844 that attach to front frame 806. Positioning device 804 comprises front frame 806, left side frame 812, right side frame 810, and positioning interfaces 830. The elements of positioning device 804 perform similar functions to those of positioning device 204 shown in FIG. 2A, FIG. 2B, and FIG. 2C. Electronic display 842 may be a LCD (liquid crystal display) display, OLED (organic light emitting diode) display, or other possible electronic display. Electronic display 842 may be powered from batteries or other power sources available inside electronic display 842 or positioning device 804. Display supports 844 may be made of metals, wire, plastics, or other materials and may be rigid or flexible. Embodiments are possible in which display supports 844 includes adjustable mountings or other features to allow the position of electronic display 842 to be adjusted. As shown in FIG. 8, the back of electronic display 842 is visible in the figure and the right eye of user 802 may view the display surface of electronic display 842. Electronic display 842 may alternatively be placed in front of the left eye of user 802 in some embodiments. Other embodiments may place electronic display 842 in the center of front frame 806 so that either or both eyes may be used to view it. Those skilled in the art will recognize that many possible sizes, shapes, mountings, and other configurations of electronic displays 842 are possible.

The embodiments of front frame 806, left side frame 812, and right side frame 810 as shown in FIG. 8 are designed to allow open area around the eyes of user 802 so that visibility of user 802 may be increased and considerable room is available for user 802 to wear eyeglasses. Those skilled in the art will recognize that the embodiment of positioning device 804 is one of many possible embodiments of front frames and side frames that may be configured in a wide variety of ways.

Electronic display 842 may be used to display images or video helpful to user 802. Camera images or video from a camera on a hair cutting device (such as hair cutting device 140), camera images from an electronic computing device (such as camera 106), or camera images or video from other cameras in an automated hair cutting system may be displayed on electronic display 842. Electronic display 842 may also convey instructions, guidance information, or other information helpful to a user 802 in the course of a haircut. Electronic display 842 may also be used to display other useful, entertaining, or other information to user 802. While no speakers or other audio devices are shown in the embodiment of positioning device 804 of FIG. 8, speakers or other audio devices may be used in some embodiments to provide sound signals that may be coordinated with video or images on electronic display 842. Other embodiments may utilize ear supports that couple into the ears of a user 802 and contains speakers, such as "ear buds" or the like, or side frames may have speakers mounted on them to provide audio entertainment, information, and other audio content to user 802.

Figure 9:
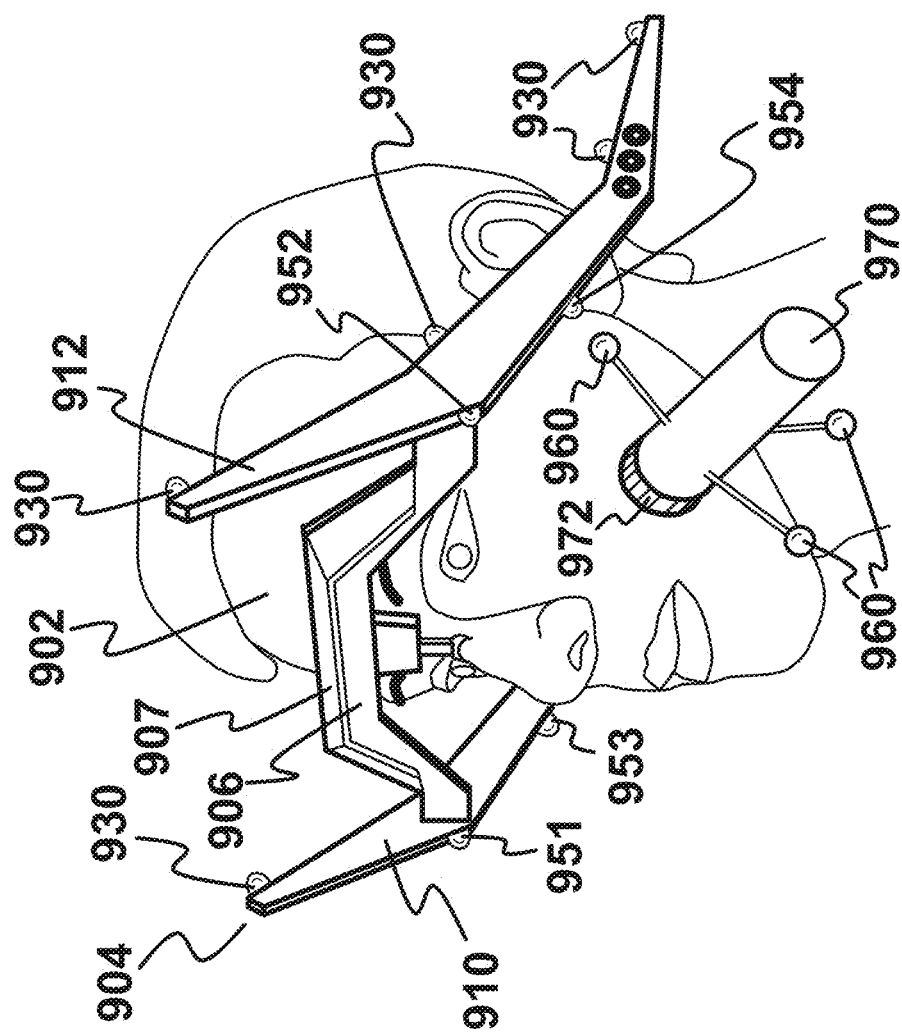
FIG. 9 shows a perspective view of still another embodiment of a positioning device according to the present disclosure.

FIG. 9 shows a perspective view of an embodiment of positioning device 904 worn by user 902 utilizing a shaver 970. Positioning device 904 comprises front frame 906, left side frame 912, right side frame 910, upper positioning interfaces 930, shield 907, lower left forward positioning interface 952, lower left rear positioning interface 954, lower right forward positioning interface 951, and lower right rear positioning interface 953. Shaver 970 comprises sensors 960 and rotary cutter 972. Lower left forward positioning interface 952, lower left rear positioning interface 954, lower right forward positioning interface 951, and lower right rear positioning interface 953 may generate positioning signals that are received by sensors 960 so that an automated hair cutting system may determine the position and/or orientation of shaver 970 with respect to the head and face of user 902 and control rotary cutter 972 to provide a shave to user 902. Rotary cutter 972 may be turned on and off based on its position on the face of user 902 so that shaver 970 may substantially accurately shave the face of user 902. Shaver 970 may be responsive to signals from an automated hair cutting system to control the length to which rotary cutter 972 may cut whiskers, control the speed of rotary cutter 972, control whether rotary cutter is turned on and enabled for cutting or turned off, or other possible signals. Shaver 970 may be used in such a manner to provide a substantially detailed and accurate pattern on the face of user 902 so that beards, mustaches, or other facial hair features may be quickly and accurately created and maintained. While the addition of lower left forward positioning interface 952, lower left rear positioning interface 954, lower right forward positioning interface 951, and lower right rear positioning interface 953 to positioning device 904 may extend the benefits of an automated hair cutting system to automated shaving, other or additional positioning interfaces may be further added to positioning device 904 to enable further capabilities. Embodiments of positioning devices may be generated for position determination and control of a wide range of shavers, trimmers, clippers, hair thinners, makeup applicators, face paint applicators, lipstick applicators, eye makeup applicators, facial massagers, and other devices. While shaver 970 makes use of rotary cutter 972, a wide range of shavers are possible that use a wide range of possible cutting heads. And while shaver 970 utilizes three sensors on sensor support posts, embodiments of shavers or other devices that may interact with a positioning device may utilize other numbers of sensors.

Shield 907 is mounted on front frame 906 and extends substantially forward in the direction that user 902 is looking so that the eyes of user 902 are shielded from above in the manner that a common visor or brim (also sometimes referred to as a bill) on a hat also substantially shields a wearer's eyes. Shield 907 may also shield the eyes of user 902 from positioning signals generated by the positioning interfaces 930. Embodiments of positioning interfaces may normally produce positioning signals at substantially low power levels so that user 902 is substantially safe from exposure to those positioning signals. However, as a user's 902 eyes may be especially sensitive, some embodiments may include the use of shields to protect user 902. Shield 907 may also shield the eyes of user 902 from cut hair that may fall in front of front frame 906 as hair is cut. Shield 907 may vary in size and span along the front frame 906 and in some embodiments, may extend below the right side frame 912 and left side frame 914. In addition to user protection, shield 907 may provide additional stability and strength to the structure of positioning device 904. Some embodiments of side frames, front frames 906, and shields 907, may include pins, indentations, catches, detents, or other features that may allow embodiments of shield 907 to more intimately contact and possibly inter-lock with side frames when side frames of a positioning device are swung open so that a user may wear the positioning device. A wide range of shields and protectors may be applied to positioning devices. Shields that cover a user's 902 eyes in the fashion of safety glasses (that is, with clear shields that a user 902 can see through) and other embodiments of shields are also possible. Shield 907 may be constructed from metals, plastics, wood, or other materials and may be formed with front frame 906 during fabrication or may be formed separately and attached to front frame 906. The material selected for shield 907 may accordingly be selected depending of the types of signals transmitted by positioning interfaces 930, and some shields on positioning devices may include head pads, forehead rests, or other features that touch or conform to a user's 902 head.

Figure 10:
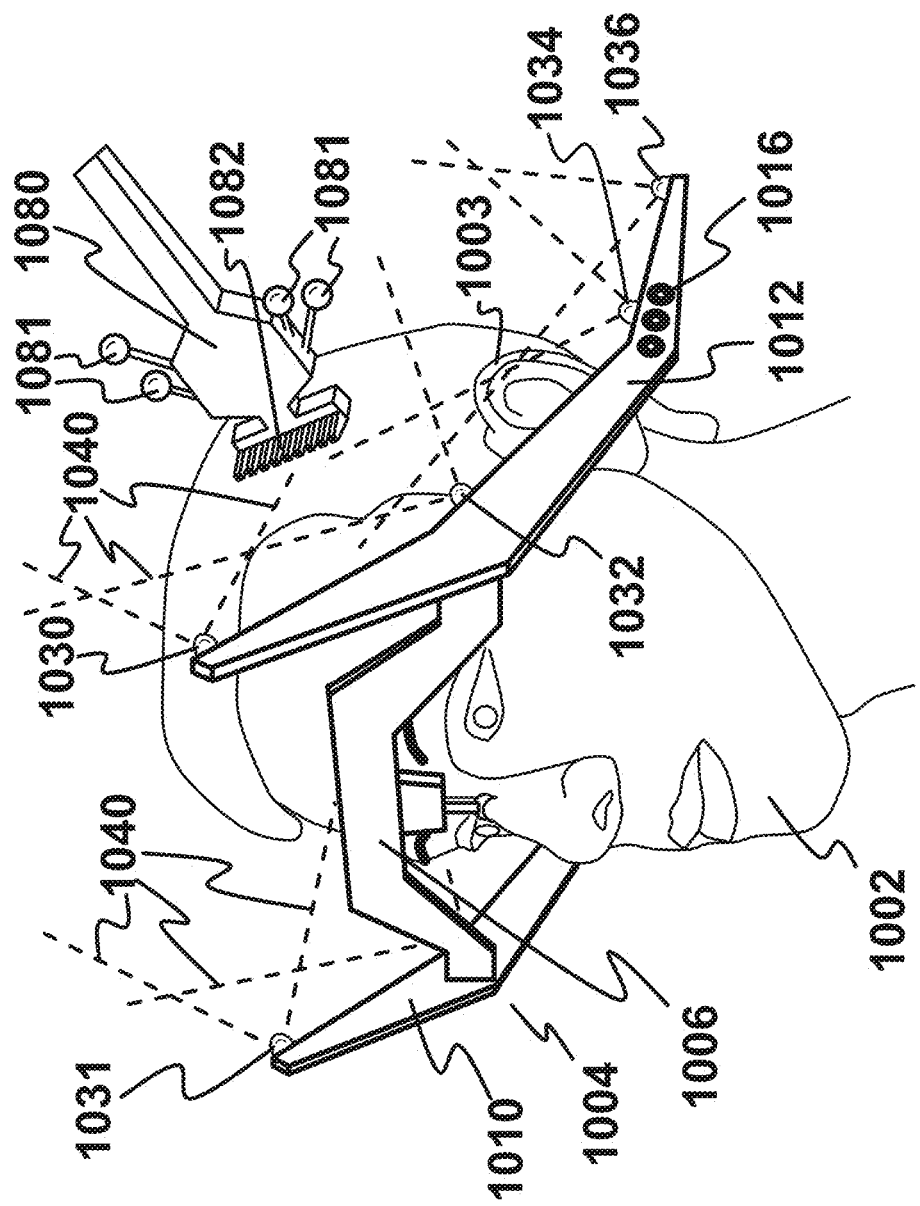
FIG. 10 shows a perspective view of a user wearing a positioning device according to the present disclosure along with a hair cutting device positioned above the user's head.
Figure 13:
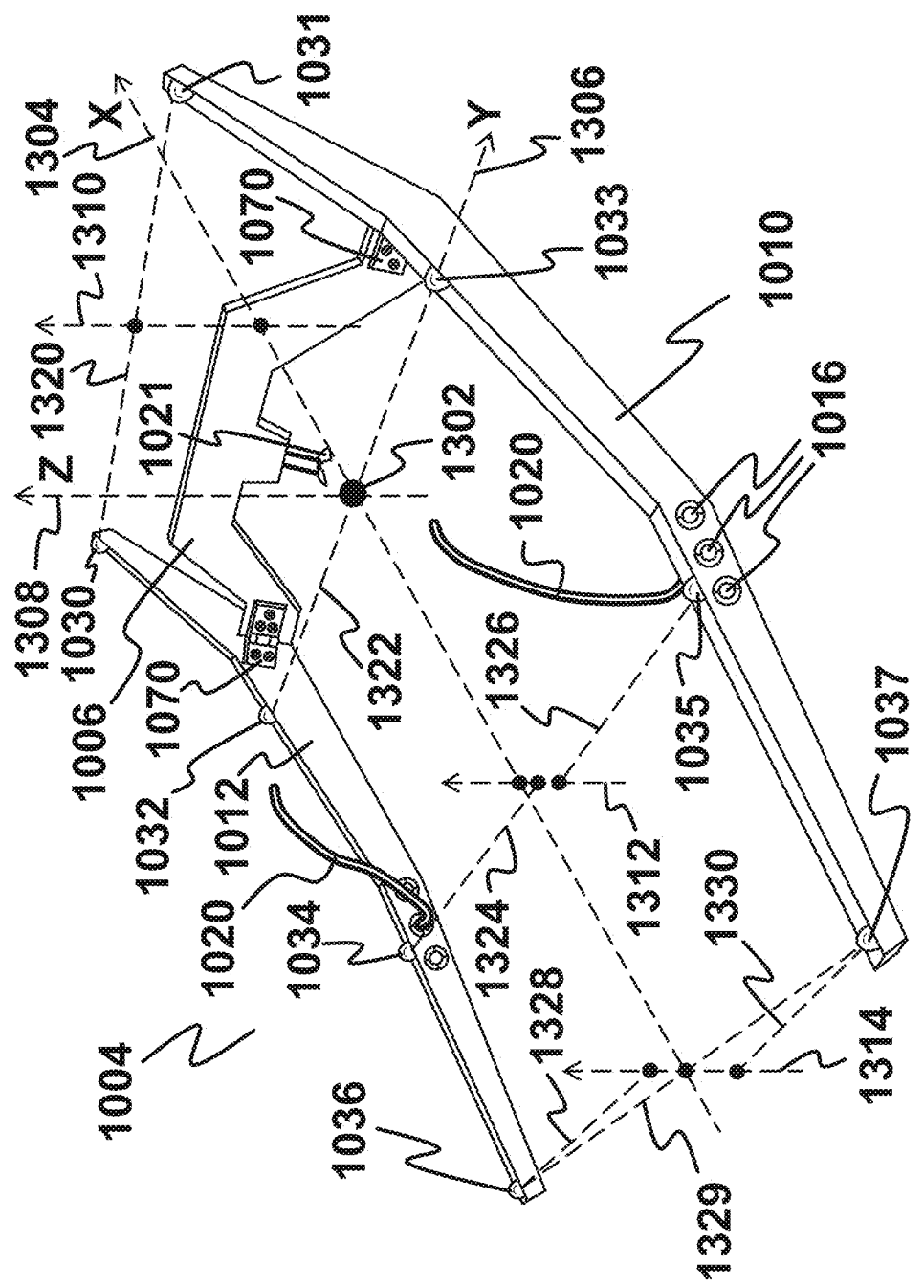
FIG. 13 shows a perspective view of a positioning device having a coordinate system associated with it.

FIG. 10 shows a perspective view of an embodiment of a positioning device 1004 being worn by user 1002. User's 1002 left ear 1003 is numbered in FIG. 10 as it will be subsequently referenced with regard to other figures. Positioning device 1004 comprises front frame 1006, right side frame 1010, left side frame 1012, ear support holes 1016, left front positioning interface 1030, left second positioning interface 1032, left third positioning interface 1034, left rear positioning interface 1036, right front positioning interface 1031, right second positioning interface 1033, right third positioning interface 1035, and right rear positioning interface 1037. Right second positioning interface 1033, right third positioning interface 1035, and right rear positioning interface 1037 are not actually visible in the view shown in FIG. 10, but are shown in FIG. 13, so their position and function is clear. The positioning interfaces of positioning device 1004 interact through positioning signals with positioning sensors 1081 on hair cutting device 1080, allowing an automated hair cutting system to determine the position and/or orientation of hair cutting device 1080 relative to positioning device 1004. Hair cutting device 1080 includes cutter head 1082. Positioning device 1004 includes eight positioning interfaces and hair cutting device 1080 includes four positioning sensors 1081, however, positioning devices and hair cutting devices with other numbers of positioning interfaces and sensors, respectively, are possible.

FIG. 10 illustrates dashed lines 1040 that provide an indication of the regions that each positioning interface may best transmit or receive positioning signals. Pairs of dashed lines 1040 in FIG. 10 emanating from the same positioning interface indicate regions between those dashed lines 1040 in which positioning sensors 1081 on hair cutting device 1080 may receive substantially robust signals. Hence, FIG. 10 provides an illustration of how positioning interfaces may be directed to provide signals for positioning purposes to substantially all regions around the head of a user 1002. Note that left front positioning interface 1030 and right front positioning interface 1031 are directed upward and rearward so that the positioning signals they generate are directed toward the upper forehead and over the head of user 1002.

Left rear positioning interface 1036 and right rear positioning interface 1037 are directed upward and forward so that the positioning signals they generate are directed toward the back of the head and over the head of user 1002. And left second positioning interface 1032, left third positioning interface 1034, right second positioning interface 1033, and right third positioning interface 1035 are directed mainly upward so that the positioning signals they generate are directed up the side and over the head of user 1002.

Use of directed signals on positioning interfaces for positioning devices such as shown in FIG. 10 may enable lower signal power levels, provide longer signal transmission range, improve accuracy, and other benefits versus use of positioning interfaces that generate signals substantially uniformly in all directions. And further, many strategies and combinations of positioning interfaces directing signals in various directions for use with many possible positioning devices are possible. Sensors 1081 on hair cutting device 1080 may also be directed in preferred directions to benefit operation of an automated hair cutting system. While the explanation of FIG. 10 has focused on positioning signals generated by positioning interfaces on positioning device 1004 and sensed by sensors 1081 on hair cutting device 1080, embodiments are also possible in which signals are generated on hair cutting device 1080 and are sensed by sensors on positioning device 1004 or even in which some signals flow in both directions (or change directions at various times in the course of operation of an automated hair cutting system).

Positioning devices such as positioning device 1004 and many other possible embodiments of positioning devices may be designed to be light weight as they may attach to or be supported by the face or head of a user 1002. Consequently, light-weight materials such as plastics, wood, metals, and other possible materials may be favored for construction of a positioning device. Positioning devices may also be constructed from materials that may bend, flex, warp, or deform to some degree to accommodate fitting to various users that may have various sizes and shapes of heads. Hence, it is beneficial to offer a way to accommodate changes in the shape and fit of a positioning device so that it may be allowed to bend, flex, warp, deform, or otherwise be altered to fit a specific user. FIGS. 10-13 provide examples of various embodiments of positioning devices and use of positioning devices in automatic hair cutting systems that compensate for the fit of a positioning device on the head of a variety of users. Use of electronic techniques allows the location of positioning interfaces to be assigned with a coordinate system while allowing for flexibility and accommodation of deformation of a positioning device.

Figure 11:
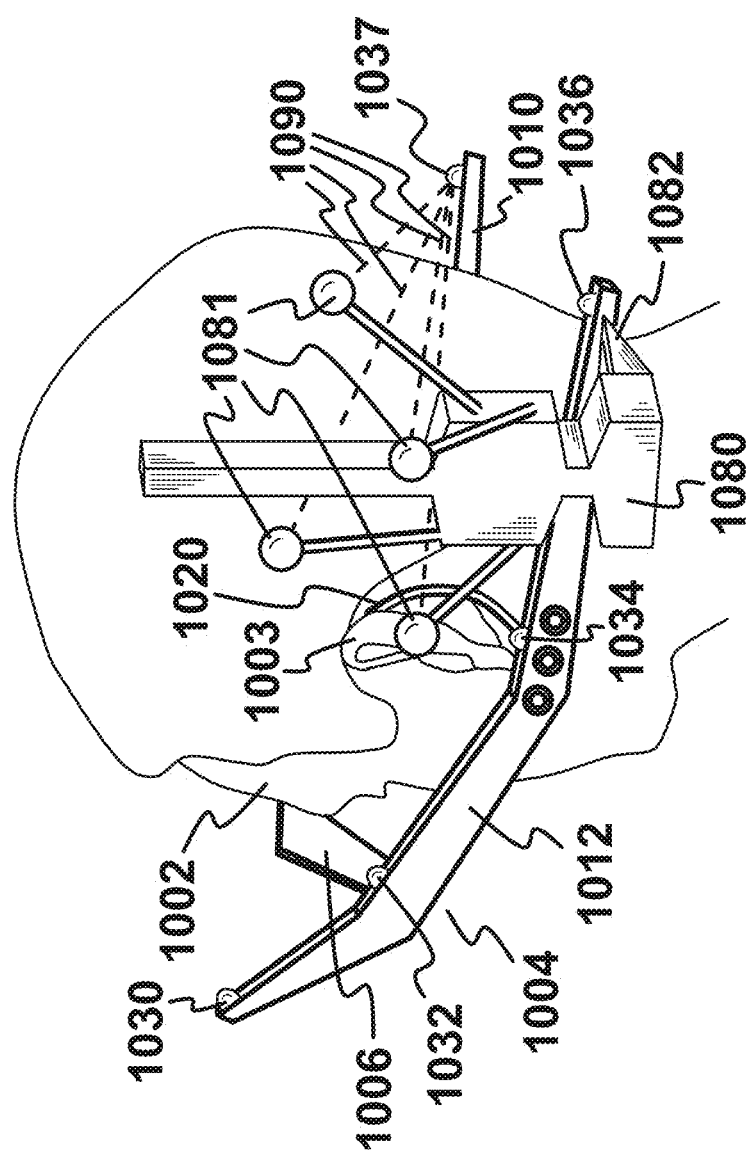
FIG. 11 shows another perspective view of the user wearing the positioning device shown in FIG. 10 with a hair cutting device positioned beside the user's head.

FIG. 11 shows positioning device 1004 on the head of user 1002 along with hair cutting device 1080. Like numbered elements in FIG. 11 perform the same functions as those so numbered in FIG. 10. Sensors 1081 in FIG. 11 are shown receiving positioning signals indicated by dashed lines 1090 that emanate from right rear positioning interface 1037. The tip of cutter head 1082 of hair cutting device 1080 is touching the outside of left side frame 1012 of positioning device 1004 near left rear positioning interface 1036 so that through analysis of the propagation times of the positioning signals represented by dashed lines 1090 from right rear positioning interface 1037 to sensors 1081 that the distance from right rear positioning interface 1037 to left rear positioning interface 1036 may be substantially accurately measured. Construction of hair cutting device 1080 has known dimensions and shape so that the location of the tip of cutter head 1082 may be computed from knowledge of the location of sensors 1081. While use of positioning signals represented by dashed lines 1090 may only provide the distance each sensor 1081 is from right rear positioning interface 1037, taken together, knowledge of the distance of each sensor 1081 from right rear positioning interface 1037, in conjunction with known dimensions and shape of hair cutting device 1080, and the dimensions and shape of positioning device 1004 in the vicinity near to left rear positioning interface 1036, provides sufficient information to compute the distance from right rear positioning interface 1037 to left rear positioning interface 1036. In some embodiments, additional positioning signals from other positioning interfaces on positioning device 1004 may be used to establish that hair cutting device 1080 is being held in substantially the proper position as shown in FIG. 11 for the measurement demonstrated.

In some embodiments, some of the sensors 1081 may be blocked by the head of user 1002 so that only some of the sensors 1081 available may be useful for the measurement shown in FIG. 11. Additionally, while use of at least three sensors 1081 may provide a substantially accurate measurement as shown in FIG. 11, supplemental information known about the orientation of hair cutting device 1080 may allow some embodiments to operate with more or fewer than three sensors 1081. For example, if user 1002 or other person manipulating hair cutting device 1080 is asked to position the head of user 1002 substantially upright and to hold hair cutting device 1080 substantially upright with the tip of cutter head 1082 touching the outer rear surface of left side frame 1012, only a single sensor 1081 may be sufficient to provide a sufficiently accurate measurement of the distance from right rear positioning interface 1037 to left rear positioning interface 1036.

Some embodiments of left side frame 1012 may contain an indentation, groove, ridge, corrugation, or other physical feature to mate with the tip of cutter head 1082 to assist user 1002 in holding hair cutting device 1080 in a stable fashion with the tip of cutter head 1082 mated in or against or otherwise stabilized by such an indentation, groove, ridge, corrugation, or other physical feature. Also, while the embodiment of FIG. 11 shows hair cutting device 1080 held against left side frame 1012 and with positioning signals emanating from right rear positioning interface 1037, hair cutting device 1080 may also be held in a similar fashion against the outer surface of right side frame 1010 and utilize positioning signals emanating from left rear positioning interface 1036. And also, in place of hair cutting device 1080, a stylus or other measuring device fitted with sensors such as sensors 1081 suitable for measuring distances using positioning signals may be utilized in some embodiments.

Additionally, some embodiments may utilize positioning interfaces that are capable of both sending and receiving positioning signals. Hence, the distance from right rear positioning interface 1037 to left rear positioning interface 1036 may be measured without the need for a hair cutting device, stylus, or other device, since such a positioning device may measure the distance from right rear positioning interface 1037 to left rear positioning interface 1036 directly. Many ways to measure the distance from right rear positioning interface 1037 to left rear positioning interface 1036 may be applied to many possible embodiments including sonar, radar, lidar, camera ranging systems, signal time-of-flight measurement techniques, and other possible techniques. And it is also possible for a user to measure the distance from right rear positioning interface 1037 to left rear positioning interface 1036 with a tape measure, ruler, or other measurement tool and input the distance into an electronic computing device or other element of an automated hair cutting system so that it may be accounted for.

Knowledge of the distance from right rear positioning interface 1037 to left rear positioning interface 1036 is beneficial in determining the locations of the positioning interfaces. This concept is illustrated with the view of positioning device 1004 shown in FIG. 13 where the distance from right rear positioning interface 1037 to left rear positioning interface 1036 is explicitly shown as the length of dashed line 1329. This will be explained in more detail after additional measurements useful for determining the locations of the positioning interfaces of a positioning device 1004 are explained with regard to FIG. 12.

Figure 12:
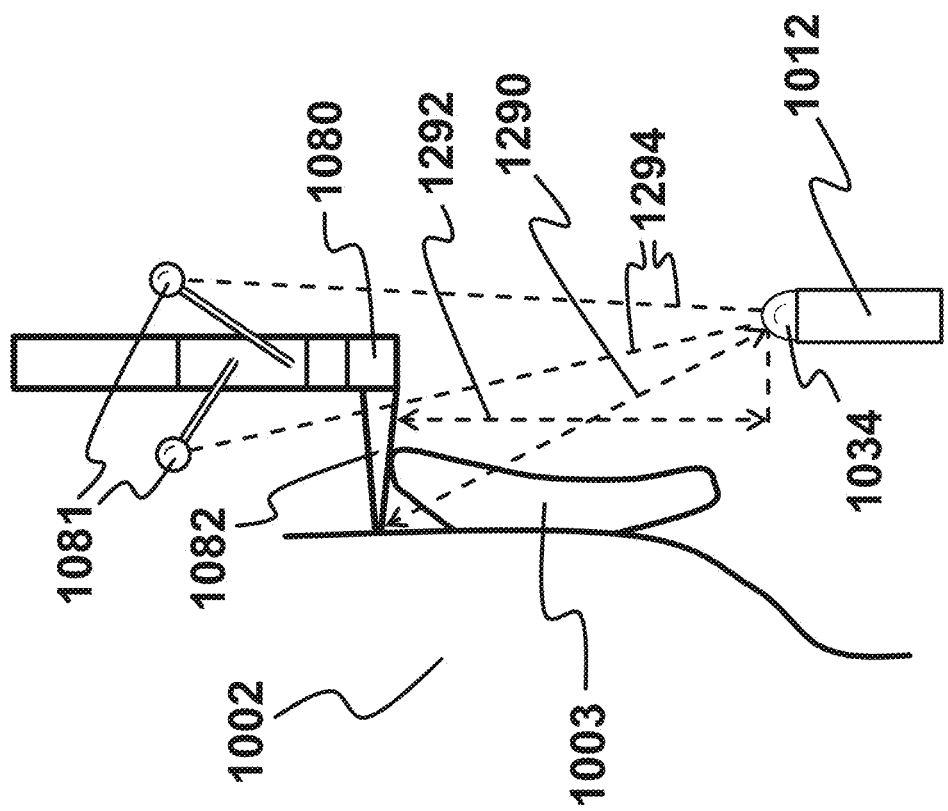
FIG. 12 shows a schematic view of an ear and side of a user's face along with a hair cutting device and a positioning interface according to the present disclosure mounted on a side frame.

FIG. 12 shows a side view of the head of user 1002 with left ear 1003. The view of a hair cutting device 1080 with sensors 1081, and cutter head 1082 is shown positioned upright with the tip of cutter head 1082 touching the side of the head of user 1002 and with the bottom of cutter head 1082 just touching the top of left ear 1003. In FIG. 12, user 1002 is oriented to be looking forward. Dashed lines 1294 indicate the propagation paths of positioning signals from left third positioning interface 1034 to sensors 1081. While FIG. 12 only shows two sensors 1081 due to the view shown (since the view is straight on from the front, two of the sensors 1081 block the view of the other two), the use of four sensors 1081 in total on hair cutting device 1080 is clear from FIG. 10 and FIG. 11. So while only two dashed lines 1294 are shown in FIG. 12 due to the nature of the view, it is clear that dimensions from left third positioning interface 1034 to all four sensors 1081 on hair cutting device 1080 may be determined and utilized. Vertical dimension 1292 shown in FIG. 12 provides substantially a physical vertical dimension from the top of ear 1003 to left third positioning interface 1034. Head side dimension 1290 shown in FIG. 12 provides substantially the physical dimension from the point at which cutter head 1082 touches the side of the head of user 1002 to left third positioning interface 1034. The measurement of vertical dimension 1292 and head side dimension 1290 may be determined from the distances measured for dashed lines 1294 and from mathematical computations (possibly using all four possibly available dimensions from left third positioning interface 1034 to each of the four sensors 1081 of hair cutting device 1080).

The base of cutter head 1082 has a tapered and slanted base. Consequently, vertical dimension 1292 and head side dimension 1290 may be slightly different from what they would be if cutter head 1082 had a flat base at a right angle to the main structure of hair cutting device 1080. Those skilled in the art will recognize that the resulting error in vertical dimension 1292 and head side dimension 1290 may be negligibly small, or may be compensated with knowledge of how the base of cutter head 1082 tapers. Also, for some embodiments of a method for how coordinates may be assigned to positioning interfaces, including an embodiment to be explained in the present disclosure, only the difference of the values of vertical dimension 1292 and head side dimension 1290 for the right and left side of a user's 1002 head are utilized, so that the effect of the taper of the base of cutter head 1082 is not of consequence as it is substantially eliminated in the subtraction of the dimensions.

Some embodiments of positioning devices may include a positioning interface, such as left third positioning interface 1034, that it is substantially close to left ear 1003 of user 1002. While many embodiments are possible with various possible placements of positioning interfaces on various possible positioning devices, there is benefit in being able to take convenient measurements of some dimensions associated with the fit of a positioning device on the head of a user. Placement of left third positioning interface 1034 on positioning device 1004 so that it is substantially close to left ear 1003 may allow a substantially unobstructed, vertical, and short signal path for positioning signals 1294 so that a sufficiently accurate (for the calibration methods to be described) measurement of vertical dimension 1292, head side dimension 1290, and other possible useful dimensions related to the position of positioning interface 1034 relative to the top of ear 1003 may be determined. A vertical dimension may be preferred to be taken substantially parallel to the Z-axis 1308 as shown in FIG. 13. For some embodiments of positioning devices, with the associated locations of their positioning interfaces and coordinate systems that may be associated with them, a compensation of vertical dimension 1292 that may account for an angle between vertical dimension 1292 and Z-axis 1308 may be beneficial. Those skilled in the art will recognize that such a compensation may be applied generally based on a common and anticipated fit and orientation of a positioning device with respect to a user's head, ears, and facial features; or may be applied more accurately from multiple measurements from the top of a user's ears (or measurements to other parts of a user's ears) to multiple positioning interfaces. With regard to the embodiment of positioning device 1004, for example, additional measurements from the top of left ear 1003 to left second positioning interface 1032 and/or left rear positioning interface 1036, along with vertical dimension 1292, may allow vertical dimension 1292 to be compensated (using simple geometry along with knowledge of the structure and shape of positioning device 1004) so that a compensated version of vertical dimension 1292 better reflects a dimension from the top of left ear 1003 to left third positioning interface 1034 in a direction parallel to Z-axis 1308. And additionally, for embodiments in which no positioning interface is placed close to an ear of a user, those skilled in the art will also recognize that use of multiple dimensions to multiple positioning interfaces may be utilized with basic geometry to generate substantially equivalent dimensions to vertical dimension 1292 and head side dimension 1290 that may be used for the purposes of calibration of coordinate values to be explained below.

Some embodiments of positioning device 1004 may include sonar, radar, lidar, or other systems that may allow vertical dimension 1292, head side dimension 1290, and other possible useful dimensions related to the position of positioning interface 1034 relative to the top of ear 1003 to be determined automatically, so that there is no need for utilizing hair cutting device 1080 to help determine such dimensions. Those skilled in the art will recognize that a suitable sonar, radar, lidar, or other systems capable of identifying objects and measuring distance to them could be used in addition to or in place of positioning interface 1034 so that vertical dimension 1292, head side dimension 1290, and other possible useful dimensions may be collected automatically without the need for an operator or user 1002 to position hair cutting device 1080 to take part in collecting those dimensions. For some such embodiments, even a single positioning interface, such as positioning interface 1034, may be applied if it can both generate signals and receive reflected signals from left ear 1003. And in some embodiments, multiple reflections may be utilized from various surfaces on left ear 1003. Those skilled in the art will recognize that utilizing a sonar, radar, lidar, or similar system providing dimensions to one or more positioning interfaces may be robust for some embodiments. Measurements may be analyzed with regard to bounded ranges to simplify analysis of signal returns and improve robustness of operation of an automated hair cutting system.

FIG. 13 illustrates another perspective view of positioning device 1004. Positioning device 1004 comprises front frame 1006, left side frame 1012, right side frame 1010, and hinges 1070 to secure the side frames to front frame 1006. Ear supports 1020 are shown inserted in ear support holes 1016 in both left side frame 1012 and right side frame 1010. Ear supports hook over the back of the ears of a user 1002 that may wear positioning device 1004.

FIG. 13 also shows a rectangular coordinate system associated with positioning device 1004. Y-axis 1306 in FIG. 13 is defined as a line connecting left second positioning interface 1032 and right second positioning interface 1033. Y-axis 1306 is shown as a dashed line in FIG. 13 and the positive Y-axis direction is substantially to the right (that is, to the right as defined for a user 1002 that may wear positioning device 1004). X-axis 1304 is defined as a line connecting the midpoint of dashed line 1329 that connects left rear positioning interface 1036 and right rear positioning interface 1037, and the mid-point of the Y-axis between left second positioning interface 1032 and right second positioning interface 1033. X-axis 1304 is shown as a dashed line in FIG. 13 and the positive X-axis 1304 is taken substantially in the forward direction (that is, in the direction a user 1002 wearing positioning device would look straight forward). Z-axis 1308 is defined as orthogonal to the X-axis 1304 and Y-axis 1306 and intersects X-axis 1304 and Y-axis 1306 at origin 1302. Origin 1302 is shown in FIG. 13 as a black dot for clarity. Z-axis 1308 is also shown as a dashed line in FIG. 13 and the positive Z-axis is taken in the substantially upward direction (upward in the sense of a wearer of positioning device 1004). Arrows on the ends of the dashed lines representing the axes in FIG. 13 are in the direction of the positive direction of each axis.

X-axis 1304, Y-axis 1306, and Z-axis 1308 are orthogonal axes (intersecting at origin 1302 so that each is at a right angle to the other two) and, taken together, define a space in which coordinate positions may be assigned to elements so that measurements may be taken and computations relating to the position and/or orientation of elements may be undertaken. Assignment of coordinate numbers on the X-axis 1304, Y-axis 1306, and Z-axis 1308 may be done with many different units of measurement, such as inches, millimeters, centimeters, etc., and may reflect many possible linear, non-linear, quantitative (using standard measurement units, such as millimeters), or relative (assigning coordinate values as a percentage of a dimension of positioning device 1004 or other dimension, for example, a percentage of the width of front frame 1006) measurement scales. Using the coordinate system of FIG. 13 defined by X-axis 1304, Y-axis 1306, and Z-axis 1308, three dimensional coordinate locations may be assigned to the various positioning interfaces (right front positioning interface 1031, left rear positioning interface 1036, etc.). And once the positioning interfaces of positioning device 1004 are assigned coordinates, those coordinate locations may be used in conjunction with positioning signals so that distances and other dimensions may be measured so that additional elements, locations, positions on the scalp of a user, or other possible points of interest may also have coordinate locations assigned to them. Accordingly, the position and orientation of a hair cutting device may be determined relative to some number of positioning interfaces, and may be determined relative to the coordinate system defined by X-axis 1304, Y-axis 1306, and Z-axis 1308. And a hair cutting device, stylus, or other device with sensors suitable for receiving and analyzing positioning signals may be used to map the size and shape of the head, scalp, facial features, and other aspects of a user wearing positioning device 1004. And, the location at which a hair cutting device collects hair on the scalp of a user may be determined and assigned coordinate locations, a look up table or other reference may be utilized to determine a desired length for hair at that location, hair may be extended as the hair cutting device is lifted from the user's scalp, and a cutter head may be actuated to cut hair once a desirable length is reached.

In FIG. 13, three reference axes parallel to the Z-axis 1308 are shown to improve clarity and make the figure easier to understand. First reference axis 1310 intersects X-axis 1304 and a dashed line 1320 connecting left front positioning interface 1030 and right front positioning interface 1031. Second reference axis 1312 intersects X-axis 1304, a dashed line 1324 extending parallel to the Y-axis 1306 from left third positioning interface 1034, and a dashed line 1326 extending parallel to the Y-axis 1306 to right third positioning interface 1035. Third reference axis 1314 intersects X-axis 1304, a dashed line 1328 extending parallel to the Y-axis 1306 from left rear positioning interface 1036, and a dashed line 1330 extending parallel to the Y-axis 1306 to right rear positioning interface 1037. Third reference axis 1314 also intersects the midpoint of dashed line 1329 that extends from left rear positioning interface 1036 to right rear positioning interface 1037. The three reference axes in FIG. 13, again, are simply additional lines in the figure parallel to the Z-axis 1308 and are included for clarity and simplicity only. While some embodiments may include additional axes (for example in over-determined or redundant coordinate systems), the reference axes as shown in FIG. 13 are not used for assignment of additional coordinate values in the embodiment as shown.

In FIG. 13, a vertical difference exists between the point where first reference axis 1310 intersects X-axis 1304 and where first reference axis 1310 intersects dashed line 1320. This vertical difference substantially provides the Z-axis coordinate value for the coordinates assigned to left front positioning interface 1030 and right front positioning interface 1031. Since front frame 1006 and hinges 1070 may be sufficiently rigid to keep the dimension along Y-axis 1306 between left second positioning interface 1032 and right second positioning interface 1033 substantially constant, Y-axis 1306 has been defined in FIG. 13 as the line connecting left second positioning interface 1032 and right second positioning interface 1033 and extending to the right. Hence, the Y-axis 1306 values for the coordinate locations of left front positioning interface 1030 and right front positioning interface 1031 are provided by the distance from origin 1302 to left second positioning interface 1032 (reflected as a negative number as it is in the negative Y-axis 1306 direction) and the distance from origin 1302 to right second positioning interface 1033 (reflected as a positive number). The X-axis 1304 coordinate value for left front positioning interface 1030 and right front positioning interface 1031 is given by the distance from origin 1302 to the intersection of first reference axis 1310 and X-axis 1304.

If left side frame 1012 and right side frame 1010 were substantially flat and parallel and if positioning device 1004 were very rigidly constructed, that assignment of coordinate values to the remaining positioning interfaces of positioning device 1004 would be routine and would follow the method outlined in the paragraph above that explained how coordinate values may be assigned to left front positioning interface 1030 and right front positioning interface 1031. Positioning device 1004 may need to employ flexible materials and may be somewhat warped or misaligned after repeated use. Positioning device 1004 is shown warped slightly in the Z-axis 1308, as is shown in FIG. 13, with left rear positioning interface 1036 somewhat above right rear positioning interface 1037 as measured along the Z-axis 1308. As positioning device 1004 is fitted to user's 1002 with larger or smaller heads, left side frame 1012 and right side frame 1010 may bend or flex to accommodate such users. For example, users with smaller or narrower heads may fit positioning device 1004 to their heads with hinges 1070 turned inwards so that the length of dashed line 1329 may be shorter than it would be for users with larger or wider heads. And for users with somewhat larger or wider heads, pressure from the sides of user's head to ear supports 1020 may cause left side frame 1012 and right side frame 1010 to flex or bow outwards causing the length of dashed line 1329 to be longer than it would be in other cases.

A user about to receive a haircut may be instructed to put on positioning device 1004 and adjust it so that it is properly centered and fits comfortably. The user 1002 may look into a mirror and ensure that front frame 1006 appears level and aligned with their eyes and may make adjustments to ear supports 1020 and nose support 1021 to achieve a substantially proper and comfortable fit. As front frame 1006 may be constructed to provide a substantially rigid structure, and hinges 1070 may substantially connect left side frame 1012 and right side frame 1010 substantially securely to front frame 1006, if left side frame 1012 and right side frame 1010 flex under stress in substantially predictable and consistent ways, then knowledge of the length of dashed line 1329, and with an assumption that positioning device 1004 is not substantially warped in the Z-axis 1308 (for the purpose of the present disclosure, warping in the Z-axis 1308 refers to differences in the Z-axis 1308 coordinate values of positioning interfaces on left side frame 1012 versus those on right side frame 1010), allows X-axis 1304, Y-axis 1306, and Z-axis 1308 coordinates to be assigned to all positioning interfaces of positioning device 1004. In the description of FIG. 11, it was explained how the distance from right rear positioning interface 1037 to left rear positioning interface 1036 may be measured and, as is clear from FIG. 13, the distance from right rear positioning interface 1037 to left rear positioning interface 1036 is equal by definition to the length of dashed line 1329. Hence, under the assumptions that positioning device 1004 is substantially well fitted to a user 1002, the length of dashed line 1329 is known, the construction of positioning device 1004 is such that it flexes under stress in predictable ways, and positioning device 1004 is not warped so that any differences in the Z-axis 1308 coordinates of right rear positioning interface 1037 and left rear positioning interface 1036 are inconsequentially small, X-axis 1304, Y-axis 1306, and Z-axis coordinates may be assigned to all positioning interfaces.

As noted above, if left side frame 1012 and right side frame 1010 flex under stress in predictable ways, that knowledge of the length of dashed line 1329 will provide information useful in determining coordinate values for the positioning interfaces of positioning device 1004. For some embodiments of positioning device 1004, the flat rectangular cross-section and substantially uniform construction of left side frame 1012 and right side frame 1010 as shown in FIGS. 10-13 may be replaced with side frames that include features that cause left side frame 1012 and right side frame 1010 to preferentially flex or bend in preferred locations and in preferred ways (as opposed to flexing more uniformly over their length).

Indentations, modulations in thickness, variations in internal construction, variations in cross-sectional shape, variations in materials utilized in various regions, or other alterations in the construction of left side frame 1012 and right side frame 1010 may allow them to respond to changes in the length of dashed line 1329 in more predictable ways.

In FIG. 13, dashed line 1324 and dashed line 1326 are parallel to Y-axis 1306 and extend from left third positioning interface 1034 and right third positioning interface 1035, respectively, to second reference axis 1312. The difference between the intersection points of dashed line 1324 and dashed line 1326 with second reference axis 1312 provides a measure of the Z-axis 1308 warping of positioning device 1004. Note that vertical dimension 1292, that was measured and explained with regard to FIG. 12, provides the distance from the top of the left ear 1003 of user 1002 to left third positioning interface 1034. Similarly, an equivalent dimension may be measured using the method explained with regard to FIG. 12 for a vertical dimension from the top of the right ear of user 1002 to right third positioning interface 1035. With the assumption that the tops of the ears of user 1002 are level and provide an accurate reference from which a haircut may be based, the vertical dimension from the top of the right ear of user 1002 to right third positioning interface 1035 subtracted from vertical dimension 1292 should be substantially equal in absolute value (i.e. the unsigned result of the subtraction) to the difference between the intersection points of dashed line 1324 and dashed line 1326 with second reference axis 1312. If vertical dimension 1292 is smaller than the vertical dimension from the top of the right ear of user 1002 to right third positioning interface 1035, then dashed line 1324 will intersect second reference axis 1312 above (above here means further in the direction of the positive Z-axis 1308) where dashed line 1326 intersects second reference axis 1312 (this arrangement is as shown in FIG. 13), and if vertical dimension 1292 is larger than the vertical dimension from the top of the right ear of user 1002 to right third positioning interface 1035, dashed line 1326 will intersect second reference axis 1312 above dashed line 1324. As the ideal Z-axis 1308 coordinates for left third positioning interface 1034 and right third positioning interface 1035 would be known from the construction of positioning device 1004 for the case of no Z-axis 1308 warping of positioning device 1004, the Z-axis 1308 coordinate for left third positioning interface 1034 with Z-axis warping accounted for would be it's ideal (with no Z-axis warping) coordinate value added to half the difference between where dashed line 1324 and dashed line 1326 intersect second reference axis 1312 (for the case shown in FIG. 13 where dashed line 1324 intersects second reference axis 1312 above dashed line 1326). And the Z-axis 1308 coordinate for right third positioning interface 1035 with Z-axis warping accounted for would be it's ideal (with no Z-axis warping) coordinate value minus half the difference between where dashed line 1324 and dashed line 1326 intersect second reference axis 1312. Hence, with knowledge of vertical dimension 1292 and the vertical dimension from the top of the right ear of user 1002 to right third positioning interface 1035 (again, a similarly measured dimension to vertical dimension 1292 just taken on the right side of user's 1002 head), the difference in the Z-axis 1308 coordinates of left third positioning interface 1034 and right third positioning interface 1035 is known. And with information about the construction and dimensions of positioning device 1004, it is clear that this information allows Z-axis 1308 dimensions to be assigned to left third positioning interface 1034 and right third positioning interface 1035 that account for the Z-axis warping of positioning device 1004. Those skilled in the art will further recognize that computation of the Z-axis 1308 coordinate values to left rear positioning interface 1036 and right rear positioning interface 1037 is only a matter of geometry based on the construction and dimensions of positioning device 1004 once all coordinates have been assigned to left third positioning interface 1034 and right third positioning interface 1035. Given the known geometry and construction of positioning device 1004, the dimension of the separation of the intersection points of dashed line 1324 and dashed line 1326 with second reference axis 1312 allow the dimension of the separation of the intersection points of dashed line 1328 and dashed line 1330 with third reference axis 1314 to be computed. And, with the definition that the X-axis 1304 intersects the mid-point of dashed line 1329, the X-axis also intersects third reference axis 1314 at the mid-point between where dashed line 1328 and dashed line 1330 intersect with third reference axis 1314.

With the measurement of the distance from right rear positioning interface 1037 to left rear positioning interface 1036, as explained in FIG. 11, and with the measurement of vertical dimension 1292 and the vertical dimension from the top of the right ear of user 1002 to right third positioning interface 1035, as explained in FIG. 12; coordinates may be assigned to all positioning interfaces of positioning device 1004. A simple and straightforward ability to compensate for flexing and moderate levels of Z-axis 1308 warping of positioning device 1004 is a key benefit that derives from the ability of front frame 1006 to provide a substantially rigid dimension between left side frame 1012 and right side frame 1010. Front frame 1006 substantially defines the dimension between left side frame 1012 and right side frame 1010 where it adjoins them, only one additional dimension (the distance between left rear positioning interface 1036 and right rear positioning interface 1037) is needed to assign coordinates to all positioning interfaces if positioning device 1004 is assumed to not be warped in the Z-axis 1308. Warping may be accommodated with knowledge of vertical dimensions from points on a user's ears to positioning interfaces near the ears.

Other measurements may be taken to determine and calibrate the coordinate values of the positioning interfaces of positioning device 1004 and other possible positioning devices. For example, in some embodiments front frame 1006 and/or hinges 1070 may not be sufficiently secure and rigid to maintain the distance between left front positioning interface 1030 and right front positioning interface 1031 sufficiently constant as positioning device 1004 is flexed due to pressure from the head of a user wearing it. For such an embodiment, measuring the distance between left front positioning interface 1030 and right front positioning interface 1031 and making additional calibrations of positioning interface coordinate values may be beneficial. Measurements to the top of the ears of a user may be replaced with measurements to the bottoms, centers, or other convenient locations on a user's ears, and additional measurements and calibrations may be made with respect to a user's eyebrows, the corners of a user's eyes, a user's nose, or other facial features. Additional dimensions such as head side dimension 1290 may be used along with other dimensions (such as, for example, a symmetrical dimension to head side dimension 1290 measured on the right side of a user's head) to determine if positioning device 1004 is substantially centered on a user's head and to account for an off-center position in the assignment of coordinates to positioning interfaces if it is not. Some embodiments of automated hair cutting systems may include calibration routines for positioning devices that include taking camera images of a user wearing a positioning device and use of image analysis software to provide corrections and calibrations of positioning interface coordinates. Some such embodiments may take only one camera image of a user wearing a positioning device (such as from the front to ensure that a front frame is straight, level, and well-aligned to a user's eyes and facial features) while others may take multiple images or even video to provide a more complete calibration. Use of camera images in this way may be done as a primary method for calibration and assignment of coordinates to positioning interfaces, as a second check to ensure that coordinates have been substantially correctly assigned following other calibration approaches, as a fine adjustment to improve a prior calibration, or for other purposes. Those skilled in the art will recognize that very many dimensions, images, sensor readings, and associated calibrations of positioning interface coordinate locations may be made for a wide range of possible embodiments of positioning devices.

The method for calibration and assignment of X-axis 1304, Y-axis 1306, and Z-axis 1308 coordinates to the positioning interfaces of positioning device 1004 assumed that a user wearing positioning device 1004 has substantially normal, conventional, and symmetrical facial features and locations and sizes of their ears. Some individuals, of course, may have facial, skull, ear or other irregularities that may benefit from some modifications to the calibration and coordinate assignment method explained above. For such individuals, knowledge that positioning device 1004 will be calibrated based on the assumption of symmetrical facial, head, and ear features may allow them to substantially fit positioning device so that they receive a haircut that may fit them. For example, a user with one ear slightly lower than the other may benefit in some cases by applying the calibration and coordinate assignment method described above directly, as it will fit their hairstyle to be consistent with the tops of their ears so that the difference in their ear height is less noticeable. However, a user that may have lost part of the top of their left ear in an accident, may alter the measurement of vertical dimension 1292 by placing the tip of cutter head 1082 above the top of their left ear (to roughly the location where the top of their ear might have been if not for their accident and resulting loss of ear tissue), so that coordinate locations are assigned to the positioning interfaces of positioning device 1004 in such a manner that their haircut is properly aligned and consistent with the rest of their head and facial features. Those skilled in the art will recognize that while not all possible head shape and ear location irregularities may be accommodated with the simple calibration and coordinate assignment method explained for positioning device 1004, that very many individuals with mild head or facial deformations, asymmetries, etc. may receive beneficial results through minor changes in the calibration and coordinate assignment method provided.

A key feature shown in the present disclosure is a simple method to assign coordinate locations to positioning interfaces on a positioning device that are substantially referenced to key facial features of a user. Since a haircut would normally be considered to appear proper, level, and well-executed if it appears properly aligned to a user's main facial features (the ears, eyes, nose, etc.), positioning device 1004 offers benefit in providing a positioning device that, when worn normally as a user would expect to wear it, requires only minor accommodation for deformation due to fit to specific users, deformation due to repeated use, or deformation caused by other causes. Once the fit and/or deformations of positioning device 1004 have been accounted for and coordinate locations have been assigned for the positioning interfaces, that the head and scalp may be mapped relative to positioning device 1004 and a haircut may be delivered, using available techniques described for automated hair cutting systems (see Krenik '856 for more details). Many possible dimensions are possible to accommodate the fit of a positioning device to the head of a user and to allow substantially accurate assignment of coordinates to the positioning interfaces that are part of such a positioning device. Users who repeatedly use a positioning device for subsequent haircuts over time may also benefit from simplified calibrations of a positioning device to their head. For example, once a positioning device has been once fitted to user, calibration information may be kept so that the same user may need to only check a few reference points to ensure that a prior calibration may provide sufficient accuracy for a haircut (see Krenik '856 for information on reference points).

Those skilled in the art will also recognize that embodiments of alternative coordinate systems to the rectangular coordinate system defined by X-axis 1304, Y-axis 1306, and Z-axis 1308 as shown embodied in FIG. 13 are possible and may be applied to many possible embodiments of positioning devices including those described in the present disclosure. Alternative definitions and orientations of rectangular coordinate axes, polar coordinates, cylindrical coordinates, over-defined coordinate systems, non-linear coordinates, coordinate systems using axes that are not orthogonal, and many other embodiments of coordinate systems are possible.

Figure 14:
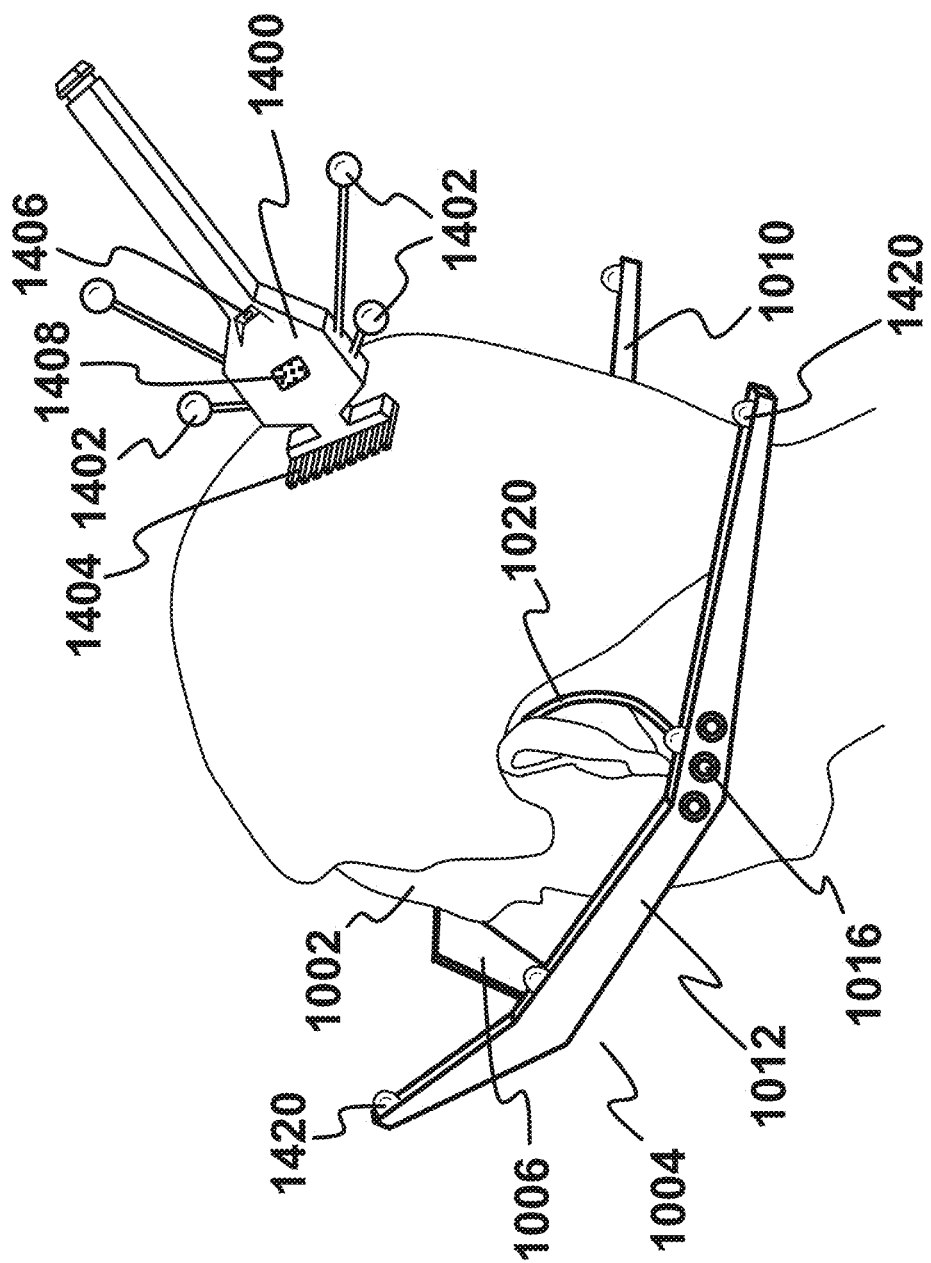
FIG. 14 shows a perspective view of a user wearing a positioning device, and having a hair cutting device including an orientation sensor positioned above the user's head.

In FIG. 14, an embodiment of a hair cutting device 1400 is shown. Hair cutting device 1400 comprises sensors 1402, cutter head 1404, camera 1406, and orientation sensor 1408. FIG. 14 also includes user 1002 and positioning device 1004. Like numbered elements in FIG. 14 have the same function as so numbered elements in FIGS. 10-13. Positioning interfaces 1420 on hair cutting device 1004 have been re-numbered so that all are numbered the same (as positioning interfaces 1420) to avoid needless clutter in the figure. Positioning interfaces 1420 perform the same and identical functions to those shown on positioning device 1004 in FIGS. 10-13. Hair cutting device 1400 is positioned on the head of user 1002 in FIG. 14 to collect hair into cutter head 1404. As the base of cutter head 1404 is placed substantially flat and tangentially to the surface of the scalp of user 1002, it is clear that the orientation of hair cutting device 1400 will change as a function of the position that it rests on the head and scalp of user 1002. Consequently, the incorporation of an orientation sensor 1408 in hair cutting device 1400 may provide benefit in providing hair cutting device 1400 an additional source of information for determining its position in addition to interaction with positioning device 1004, utilizing camera images from camera 1406, or utilizing additional information it may have from other sensors that may be available in various embodiments. Note especially that if user 1002 or another person manipulating hair cutting device 1400 is asked to carefully position hair cutting device 1400 when hair is collected in cutter head 1404 so that the base of cutter head 1404 is substantially flat on the scalp (that is, so that the base of cutter head 1404 is substantially tangent to the surface of the scalp of user 1002) of user 1002, and user 1002 is asked to hold their head upright, that an understanding of the orientation of hair cutting device 1400 at such a point may provide information helpful in the determination of the position of hair cutting device 1400 (and so the position of cutter head 1404) on the scalp of user 1002. Hence, a computer or other electronic circuit contained inside hair cutting device 1400 or possibly located in some other element of an automated hair cutting system may utilize a signal or signals from orientation sensor 1408 and may possibly also use additional inputs from sensors 1402, other sensors, cameras, positioning device 1004, or other possible information available; along with a mathematical model or other information regarding the size and/or shape of the head of a user; to determine an estimate for where the base of cutter head 1404 rests on the head of a user 1002. Use of orientation relative to the scalp of a user for position determination is illustrated for further clarity in FIG. 15 and is described below.

As determination of position from orientation of hair cutting device 1404 is dependent on the comb teeth of cutter head 1404 being substantially flat and parallel to the surface of the scalp (that is, tangent to the surface of the scalp) of a user as hair is collected in cutter head 1404, embodiments are possible in which the comb teeth of cutter head 1404 are made somewhat longer or are specially shaped so that it is easier for a person manipulating hair cutting device 1400 to position it properly. Some of the cutter heads shown in various embodiments in the present disclosure have cutter head teeth that taper substantially to a point at the tips and do not have a flat base. And additionally, the rounded shape of a human head means that even a cutter head with a flat base may not intimately contact a user's 1002 scalp uniformly over its base. Hence, for some embodiments of cutter heads and locations on a user's 1002 scalp, a user may orient hair cutting device 1400 so that the base of cutter head 1404 is substantially tangential to the surface of their scalp for embodiments and situations where precisely tangential contact may not be possible. Embodiments are also possible in which a touch sensor or multiple touch sensors (see Krenik '856 for more information on touch sensors) or pressure transducers are included on the bottom of cutter head 1404 so that a user may be signaled (through an audible signal such as a chime or beep, or other possible signal) that they have substantially properly contacted cutter head 1404 to the surface of their scalp for the purpose of orientation and position determination. Embodiments utilizing multiple pressure transducers on the bottom of cutter hear 1404 may also determine when to detect the orientation of hair cutting device 1400 automatically so that a user may simply rock hair cutting device 1400 on their head until they receive a signal that the orientation of hair cutting device 1400 has been collected. Analysis of images from camera 1406 or other possible cameras in an automated hair cutting system may also be utilized to guide user 1002 to manipulate hair cutting device 1400 properly so that orientation and position may be determined.

Orientation sensor 1408 may be an accelerometer that senses the force of gravity, a gyroscope, a compass that senses orientation in a magnetic field, other possible orientation sensors, or combinations of sensors. Orientation sensor 1408 may sense motion, orientation, and/or acceleration in only one direction, in two directions, in three directions (3D motion sensing), or even in additional directions (i.e. it may provide over-determined or redundant information in some embodiments). Orientation sensor 1408 may sense position, orientation, velocity, acceleration, or combinations of these variables. In some embodiments, signals from orientation sensor 1408 may be processed to produce useful information. For example, velocity may be integrated in time to determine position; or acceleration integrated to determine velocity. Multiple sensors or combinations of sensors may be used in some embodiments to provide the functions of an orientation sensor 1408. Orientation sensor 1408 is shown as an element on the surface of hair cutting device 1400, but orientation sensor 1408 may be fully enclosed in the body of hair cutting device 1400 in some embodiments and may not be visible from inspection of the outside of hair cutting device 1400.

Hair cutting device 1400 may collect hair in a cutter head 1404 near the scalp of a user so that the location of the hair collected is substantially known. Then hair cutting device 1400 may be extended away from the scalp of user so that hair substantially slides through cutter head 1404 in a combing action. Once hair has been extended to a desired length, cutter head 1404 may be actuated so that hair is cut to substantially a beneficial length. Partially or fully determining the positioning of hair cutting device 1400 from its orientation on the scalp of user 1002 may provide information needed to know the location that hair was collected in cutter head 1404 near the scalp of a user. As hair cutting device is extended away from the head of a user so that hair slides through cutter head 1404, motion sensors or accelerometers may be used to sense the distance that hair has been extended so that the length of hair is substantially known. Once hair has been extended sufficiently to a desired length, cutter head 1404 may be actuated to cut the hair that was collected. Hair may be fully cut in a single actuation of cutter head 1404 or multiple partial actuations of cutter head 1404 may be used to thin hair, create feathered effects in hair, taper hair, or create other desirable styling effects. Use of accelerometers or motion sensors to determine the length of hair as it is extended through cutter head 1404 may be used to augment information received through use of positioning device 1004, positioning information gained from analysis of images from camera 1406, or other positioning information that may be available from other cameras or sensors. In other embodiments, accelerometers or motion sensors may be used alone to determine the length that hair has been extended to and to determine when cutter head 1404 may be actuated to cut hair.

In some embodiments, orientation sensor 1408 may be capable to measure both orientation and motion. As shown in FIG. 14, orientation sensor 1408 may be used in conjunction with positioning device 1004, or other suitable positioning device, to enhance operation of an automated hair cutting system. Embodiments are possible in which smaller, lighter, cheaper, or otherwise benefitted positioning devices 1004 may be used if an orientation sensor 1408 is utilized. For example, orientation sensor 1408 may allow a positioning device 1004 to be utilized that has fewer positioning interfaces 1420 than would otherwise be needed if orientation sensor 1408 was not utilized. Some embodiments may also benefit if positioning device 1004 also includes an orientation sensor and/or motion sensors so that the orientation of hair cutting device 1400 may be computed with respect to the head of user 1002 even if a user is not holding their head upright or if user 1002 moves their head in the course of operation of hair cutting device 1400. That is, with knowledge of the orientation of both positioning device 1004 and hair cutting device 1400, an automated hair cutting system may compute the position and orientation of hair cutting device 1400 with respect to positioning device 1004 even if user 1002 moves or is moving their head.

Embodiments are also possible in which hair cutting device 1400 may be used without any positioning device 1004 at all. That is, an automated hair cutting system may be embodied as hair cutting device 1400, as shown in FIG. 14, without use of positioning device 1004 (of course, such embodiments may include electronic computing devices, sensor hubs, and other elements, see Krenik '856 for additional information). Such embodiments may make use of information from orientation sensor 1408 to determine position on the head of user 1002 as a function of orientation as previously explained. Other embodiments may augment information from orientation sensor 1408 with information from camera 1406, other cameras, other motion sensors, and possibly other sensors to determine position and orientation relative to the head of user 1002. For some simplified embodiments, user may be instructed to remain steady with their head upright (or in some known position) so that determination of position from orientation is possible. In other embodiments, camera images, use of a small positioning device that only measures the orientation and/or motion of the head of user 1002, or other techniques may be utilized to track changes in the position and/or orientation of the head of user 1002 so that more accurate results are possible. Such a small positioning device may simply clip onto (or into) an ear of a user or may be configured to attach to both ears in the manner of a medical stethoscope and connect under user's chin or attach to the face or head of user in other possible ways. It is also noted that user may be asked to establish a reference orientation or orientations by positioning hair cutting device 1400 to a known reference position or positions and acknowledging to hair cutting device 1400 (through a button press or other signal) when hair cutting device 1400 is so positioned. For example, user may be asked to stand still with their head upright while positioning hair cutting device 1400 substantially vertically on top of the center of their head so that a reference orientation may be established from which other orientations may be measured.

Figure 15:
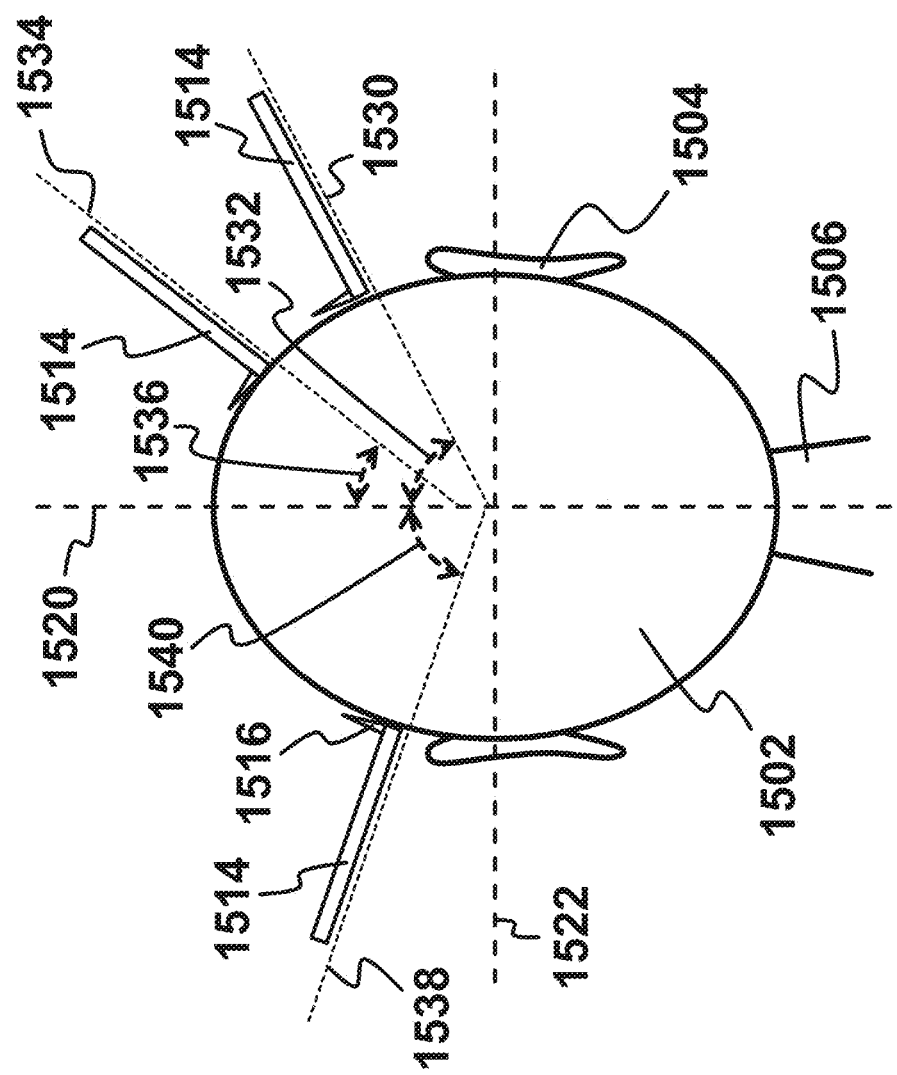
FIG. 15 shows a schematic rear view of a user's head along with a schematic view of a hair cutting device positioned at various positions on the user's head.

FIG. 15 shows a two dimensional schematic view of an embodiment of a method for how an orientation sensor may be utilized in an automated hair cutting system to determine position on a head of a user. The embodiment of FIG. 15 is shown to further make clear how position may be determined on the head of a user as a function of the orientation of a hair cutting device. FIG. 15 includes user 1502 having ears 1504 and neck 1506. In FIG. 15, no facial features besides ears 1504 are shown to avoid cluttering the figure. It may be assumed that user 1502 is looking away from the viewer so that the back of user's 1502 head is visible in FIG. 15; as will become clear, this assumption will not detract from the clarity FIG. 15 will provide for its purpose here. FIG. 15 also includes three views of hair cutting device 1514, each including cutter head 1516, at three different locations on the head of user 1502. Hair cutting device 1514 is a simplified, schematic view as shown to avoid clutter. In each view of hair cutting device 1514, the base of cutter head 1516 is substantially parallel (tangent) to the surface of the scalp of user 1502 (note that cutter head 1516 is only numbered once in FIG. 15 to avoid clutter). FIG. 15 also includes vertical reference line 1520 and horizontal reference line 1522, both shown as dashed lines in FIG. 15. Vertical reference line 1520 and horizontal reference line 1522 are used as orientation references in FIG. 15 as FIG. 15 provides only a two-dimensional view. Those skilled in the art will recognize that in actual use, three-dimensional coordinate systems, or other suitable orientation references may be used to define a geometrical reference against which orientation in three dimensions may be measured. Other structures for orientation references may be used in various embodiments.

In a first position on the head of user 1502, hair cutting device 1514 is shown parallel to first orientation measurement line 1530 at angle 1532 from vertical reference line

1520. In a second position on the head of user 1502, hair cutting device 1514 is shown parallel to second orientation measurement line 1534 at angle 1536 from vertical reference line 1520. In a third position on the head of user 1502, hair cutting device 1514 is shown parallel to third orientation measurement line 1538 at angle 1540 from vertical reference line 1520. As angle 1540 departs leftward from vertical reference line 1520 and angle 1532 and angle 1536 depart rightward from vertical reference line 1520, those skilled in the art will recognize that angle 1540 may be assigned as a negative angle, while angle 1532 and angle 1536 may be assigned as a positive angle so that angular measures from vertical reference line 1520 may be uniquely assigned in both directions. Many forms of angular measure are common and loss of unique orientation relative to a reference line may be dealt with in many conventional ways.

Knowledge of the angle of an orientation measurement line substantially parallel to a hair cutting device 1514 with respect to vertical reference line 1520, horizontal reference line 1522, or other possible reference lines that may be used for various possible embodiments, combined with at least an estimate of the shape or contour of the head/scalp of user 1502 allows position on the head of user 1502 to be substantially determined based on that angle. FIG. 15 shows an example in two dimensions for simplicity. Extension to three dimensions is possible and requires no special concepts beyond those already well-known in three-dimensional geometry and the concepts taught here.

Since the head of a user 1502 may comprise various geometric configurations, the orientation measurement lines may not intersect with the intersection of vertical reference line 1520 and horizontal reference line 1522. The accuracy of estimates of the size and shape of the user's 1502 head improves positioning accuracy; however, some embodiments may require high levels of precision and precise estimates of the shape of a user's 1502 head. Accordingly, additional sensors, positioning devices, or other sources of additional information may be needed to uniquely determine the position of a hair cutting device on the head of a user. In some embodiments, a user 1502 may provide supplementary information about the location of where cutter head 1516 lies on their head in a manual fashion so that an automated hair cutting system may uniquely determine the position of hair cutting device 1514. For example, user 1502 may touch a location on the display of an electronic computing device using a touch screen interface to provide a rough indication of the position of hair cutting device 1514, and with that information and knowledge of the orientation of hair cutting device 1514, an automated hair cutting system may be able to refine an estimate for a more precise position of hair cutting device 1514.

The shape of a user's head may be determined by simply asking the user 1502 to input the rough shape and size of their head by a selection menu through a computer interface, taking measurements of the user's 1502 head with a hair cutting device 1400 and a positioning device 1004, by direct measurement of a user's 1502 head with three-dimensional measurement fixtures, by making estimations from image analysis of camera images of a user's 402 head, or by other techniques. Mathematical models of shapes or surfaces are a well-known technique and may be utilized to provide the shape and/or size of a user's head. Many different types and constructions of such mathematical models are possible and are commonly available. Use of mathematical models may enable computers or other electronic circuits to access the shape and/or size of a user's 1502 head for computing a relative position of hair cutting device 1514.

Disclosed hereinabove are embodiments for automated hair cutting systems, hair cutting devices, positioning devices, and methods which enable the position and/or orientation of a hair cutting device to be determined relative to the head of a user receiving a haircut. Positioning devices that include front frames and side frames are provided that allow a user to easily align the positioning device to their face and fold the positioning device for compact storage. Springs may be utilized in hinges and ear supports to enhance ease of operation and improve comfort and fit. Positioning devices may include shapes allowing easier access to hair on the back of a user's head and neck, may allow positioning interfaces to more easily interact with more positioning sensors on a hair cutting device, and may allow adjustments to the shape or size of a positioning device that may cause positioning interface locations to change to be automatically compensated. Electronics, batteries, sensors, and wiring may be contained inside the structure of a positioning device, and positioning devices may be configured to allow a user to wear eyeglasses while wearing a positioning device. Positioning interfaces may be mounted on posts or other structures so that they may extend through hair draped over a positioning device. Positioning devices may also include electronic displays, shields to protect a user, and may have positioning interfaces mounted so that shavers, trimmers, makeup applicators, face paint applicators, and other accessories may be utilized with a positioning device.

Positioning devices may include a front frame that establishes a dimension between side frames so that a positioning device may more easily be calibrated for use for a variety of users with different sizes and shapes of heads. A hair cutting device may be utilized to measure some dimensions of the fit of a positioning device or the dimensions may be determined automatically so that positioning interfaces may be assigned coordinates relative to a coordinate system. Once positioning interfaces have coordinates assigned to them, the scalp of a user may be mapped with a hair cutting device so that a hair style may be fitted to the user. Some hair cutting devices may also include orientation sensors so that knowledge of orientation along with information regarding the shape of the head of a user may be utilized to help determine the position of a hair cutting device.

Those skilled in the art to which the present disclosure relates will appreciate that other and further additions, deletions, substitutions and modifications may be made to the described embodiments.

The invention claimed is:

1. A method for assigning coordinate locations to positioning interfaces on a positioning device, said positioning device having a plurality of positioning interfaces and a structure at least partially extending in front of and to either side of the face of a user wearing said positioning device, so that changes to the locations of said positioning interfaces associated with said positioning device being worn by said user are at least partially accounted for, the method comprising:

directing said user to adjust said positioning device so that said positioning device is aligned with at least one of said user's eyes and nose;

measuring at least one dimension between at least two points on said structure of said positioning device, said two points selected such that the dimension between them may vary depending on the size or shape of the head of a user wearing said positioning device;

associating a coordinate system to said positioning device; and determining coordinate values for at least one of said positioning interfaces at least partially based on said at least one dimension between at least two points on said structure of said positioning device, wherein said one dimension is taken between positioning interfaces extending substantially behind the head of said user;

wherein a hair cutting device interoperating cooperatively with said positioning device is utilized to measure said at least one dimension between at least two points on said structure of said positioning device.

2. The method according to claim 1, wherein said positioning device includes electronic measurement capability and is configured for determining at least one dimension between at least two points on said structure of said positioning device.

3. The method according to claim 1, wherein additional dimensions are measured from at least one point on each ear of said user to at least one positioning interface on each side of said positioning device, and where said coordinate values are at least partially determined by said additional dimensions.

4. The method according to claim 3, further comprising providing an electronic measurement system for measuring the additional dimensions, the electronic measurement system configured to utilize at least one of sound waves, light waves, and radio waves.

5. The method of according to claim 1, wherein said structure of said positioning device may be configured for variations in at least one of shape, size, and materials of construction.

6. A positioning device for use in an automated hair cutting system, comprising:
a frame, the frame configured to extend at least partially alongside a side of a user's head, the frame comprising at least one structural feature configured to contact the user's head and support the frame,
a plurality of positioning interfaces secured to the frame, the positioning interfaces configured to at least one of transmit signals and receive signals, said signals for at least partially determining at least one of a position and an orientation of a hair cutting device relative to the positioning device,
wherein the at least one of a position and an orientation of the hair cutting device may be represented using coordinate values defined relative to the positioning device,
wherein at least one dimension is measured between the positioning device and at least one feature of the head of the user, the at least one feature of the head of the user being from a set of features at least including the user's eyes, ears, and nose,
and wherein the at least one of a position and an orientation of the hair cutting device relative to the user's head is at least partially determined using said coordinate values and said at least one dimension.

7. The positioning device according to claim 6, wherein the frame comprises a first side frame and a second side frame each adjoining a front frame, wherein each side frame comprises an ear support for engaging a user's head near an ear.

8. The positioning device according to claim 7, wherein the first side frame and second side frame are coupled to the front frame using hinges.

9. The positioning device according to claim 7, wherein said ear support comprises springs for engaging the user's ear and applying pressure thereto.

10. The positioning device according to claim 7, wherein at least one portion of said front frame, said first side frame, or said second side frame is adjusted in size or shape relative to other portions of said front frame, said first side frame, or said second side frame, and wherein said adjustment is sensed automatically by said positioning device.

11. The positioning device according to claim 7, wherein at least one of said positioning interfaces is mounted such that said positioning interface protrudes through hair placed thereover.

12. The positioning device according to claim 7, wherein said front frame extends laterally beyond the points at which said front frame adjoins said first side frame and said second side frame and supports at least one positioning interface located laterally outside a region between said first side frame and said second side frame.

13. The positioning device according to claim 6, further comprising an electronic display.

14. The positioning device according to claim 6, further comprising a shield configured to protect a user's eyes.

15. The positioning device according to claim 6, wherein at least one positioning interface is configured to at least one of transmit a positioning signal and receive a positioning signal from a region of a user's face including the user's cheeks, chin, and mouth.

16. The positioning device according to claim 6, further configured having at least one of electronics and wiring positioned within the structure of said positioning device.

17. An automated hair cutting system for cutting hair, comprising:
a frame, the frame comprising at least one structural feature configured to contact the user's head and support the frame,
a plurality of positioning interfaces secured to the frame, the positioning interfaces configured to at least one of transmit signals and receive signals, said signals for at least partially determining at least one of a position and an orientation of a hair cutting device relative to the frame,
a processor configured to process a mathematical model for providing a head shape of a user; and
an electronic circuit for receiving input from a sensor secured to the hair cutting device and determining, based on said input from said sensor and said mathematical model, a location at which a base surface of a cutter head of the hair cutting device rests on said head of said user;
wherein the at least one of a position and an orientation of the hair cutting device may be represented using coordinate values defined relative to the frame,
wherein at least one dimension is measured between the frame and at least one feature of the head of the user, the at least one feature of the head of the user being from a set of features at least including the user's eyes, ears, and nose, and
wherein at least one of a position and an orientation of the hair cutting device relative to the user's head is at least partially determined using said coordinate values and said at least one dimension.

* * * * *